United States Patent [19]

Lundberg et al.

[11] Patent Number: 4,913,830

[45] Date of Patent: Apr. 3, 1990

[54] LACTONE-MODIFIED, MANNICH BASE DISPERSANT ADDITIVES USEFUL IN OLEAGINOUS COMPOSITIONS

[75] Inventors: Robert D. Lundberg, Bridgewater; Antonio Gutierrez, Mercerville, both of N.J.

[73] Assignee: Exxon Chemical Patents Inc., Linden, N.J.

[21] Appl. No.: 294,459

[22] Filed: Jan. 9, 1989

Related U.S. Application Data

[62] Division of Ser. No. 77,716, Jul. 24, 1987, Pat. No. 4,828,742.

[51] Int. Cl.$^4$ .................. C10M 149/16; C10M 159/16
[52] U.S. Cl. .................................. 252/49.6; 549/213; 560/189; 564/9
[58] Field of Search ............................ 549/213; 564/9; 560/189; 252/49.6

[56] References Cited

U.S. PATENT DOCUMENTS

| | | | |
|---|---|---|---|
| 3,169,945 | 2/1965 | Hostetettler et al. | 260/78.3 |
| 3,442,808 | 5/1969 | Traise et al. | 252/49.6 |
| 3,539,633 | 11/1970 | Piasek | 260/570.5 |
| 3,649,229 | 3/1972 | Otto | 44/73 |
| 3,741,896 | 6/1973 | Abbott et al. | 252/42.7 |
| 3,798,165 | 3/1974 | Piasek et al. | 252/51.5 R |
| 4,354,950 | 10/1982 | Hammon | 252/51.5 A |
| 4,362,635 | 12/1982 | Dhein et al. | 252/565 |
| 4,379,914 | 4/1983 | Lundberg | 528/354 |
| 4,463,168 | 7/1984 | Lundberg | 528/355 |
| 4,532,058 | 7/1985 | Chafetz | 252/51.5 A |
| 4,584,117 | 4/1986 | Wollenberg | 252/51.5 A |
| 4,585,566 | 4/1986 | Wollenberg | 252/51.5 A |
| 4,612,132 | 4/1986 | Wollenberg | 252/51.5 A |
| 4,614,603 | 9/1986 | Wollenberg | 252/51.5 A |
| 4,615,826 | 10/1986 | Erdman | 252/32.5 |
| 4,617,138 | 10/1986 | Wollenberg | 252/51.5 A |
| 4,624,681 | 11/1986 | Wollenberg | 44/63 |
| 4,645,515 | 2/1987 | Wollenberg | 44/63 |
| 4,647,390 | 3/1987 | Buckley et al. | 252/51.5 A |
| 4,663,062 | 5/1987 | Wollenberg | 252/47.5 |
| 4,664,827 | 5/1987 | Buckley | 252/49.6 |
| 4,666,459 | 5/1987 | Wollenberg | 44/56 |
| 4,666,460 | 5/1987 | Wollenberg | 44/63 |
| 4,668,246 | 5/1987 | Wollenberg | 44/63 |
| 4,680,129 | 7/1987 | Plavac | 252/51.5 A |
| 4,702,851 | 10/1987 | Wollenberg | 549/213 |
| 4,713,187 | 12/1987 | Buckley, III et al. | 252/49.6 |
| 4,743,386 | 5/1988 | Doner et al | 252/49.6 |
| 4,746,446 | 5/1988 | Wollenberg et al. | 252/49.6 |
| 4,747,963 | 5/1988 | Wollenberg | 252/49.6 |
| 4,802,893 | 2/1989 | Wollenberg et al. | 252/49.6 |
| 4,803,002 | 2/1989 | Wollenberg | 252/49.6 |
| 4,828,742 | 5/1989 | Lundberg et al. | 252/51.5 R |

FOREIGN PATENT DOCUMENTS 202024  11/1986  European Pat. Off. .

Primary Examiner—William R. Dixon, Jr.
Assistant Examiner—Jerry D. Johnson
Attorney, Agent, or Firm—J. B. Murray, Jr.

[57] ABSTRACT

Poly ($C_5$–$C_9$ lactone) modified Mannich base adducts are made by reacting a $C_5$–$C_9$ lactone, an amine, an aldehyde, and a hydrocarbyl substituted, hydroxy aromatic compound, e.g. a polyisobutenyl phenol which, in turn, preferably is made by reacting a polymer of a $C_2$ to $C_{10}$ monoolefin, preferably polyisobutylene, having a molecular weight of about 700 to 10,000 with a hydroxy aromatic compound. The resulting adducts are useful per se as oil soluble dispersant additives. They are also useful in fuel and lubricating oil compositions, as well as in concentrates and additive packages.

119 Claims, No Drawings

LACTONE-MODIFIED, MANNICH BASE DISPERSANT ADDITIVES USEFUL IN OLEAGINOUS COMPOSITIONS

RELATED U.S. APPLICATIONS

This is a division of application Ser. No. 77,716, filed 7/24/87, now U.S. Pat. No. 4,828,742.

This application is related to the following applications filed by the inventors herein: Ser. No. 916,218, Ser. No. 916,114 now U.S. Pat. No. 4,866,139, Ser. No. 916,113 now U.S. Pat. No. 4,866,140, Ser. No. 916,287 now U.S. Pat. No. 4,866,135, Ser. No. 916,108, Ser. No. 916,303 now U.S. Pat. No. 4,866,142 and Ser. No. 916,217 now U.S. Pat. No. 4,866,141, all of which applications were filed on Oct. 7, 1986. This application is also related to Ser. No. 77,713, filed on 7/24/77 by the inventors herein, now U.S. Pat. No. 4,820,432, and to a divisional thereof, Ser. No. 294,521, filed 1/9/89. All of these related applications are expressly incorporated herein by reference in their entirety.

BACKGROUND OF THE INVENTION

1. Field of the Invention

This invention relates to oil soluble dispersant additives useful in fuel and lubricating oil compositions, including concentrates containing said additives, and methods for their manufacture and use. The dispersant additives are poly ($C_5$–$C_9$ lactone) modified Mannich base adducts which are prepared from moieties of di- or polyamine, high molecular weight hydrocarbyl-substituted hydroxy aromatic material, aldehyde and $C_5$–$C_9$ lactone. The high molecular weight hydrocarbon group has a number average molecular weight ($\overline{M}_n$) of about 700 to about 10,000. The additives will have an average degree of polymerization (DP) of the lactone monomer of about 0.2 to about 100.

2. Prior Art

It is known that polymers of 6 to 10 membered lactones such as valerolactone or epsilon-caprolactone, hereinafter E-caprolactone, can be prepared by reacting the lactone monomer with a hydroxyl or amine initiator. When reacting E-caprolactone, for example, the polymerization reaction may be illustrated by the following equations:

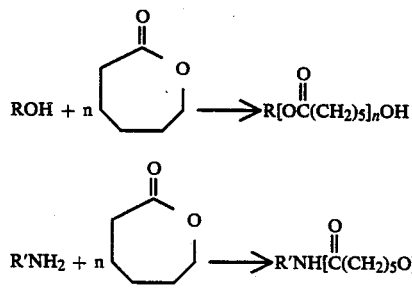

EQ. 1

EQ. 2

The reactions are known to be catalyzed by various esterification catalysts such as stannous octanoate, and a variety of different molecular weight products are feasible depending upon the ratio of lactone to initiator. Molecular weights on the order of from a few hundred up to about 5,000 are reproducably achievable.

Caprolactone can also be polymerized to a very high molecular weight, e.g., on the order of 100,000 or more. Typically such high molecular weight polymers do not employ initiators and preservation of functionality is not a requirement.

It is also known to react a lactone such as E-caprolactone with a diamine wherein one of the diamine groups is a tertiary amine and the other amine group is a primary or secondary amine to form a polycaprolactone polymer having a tertiary amine group at one end and a primary hydroxyl group at the other end. The polycaprolactone polymer would be used to neutralize polymeric acids.

U.S. Pat. No. 3,649,229 relates to Mannich base reaction products obtained from high molecular weight alkyl-substituted hydroxy aromatic compounds, amines and aldehydes. The Mannich bases are disclosed to be useful as detergency improvers for liquid hydrocarbon fuels.

It has now been found that oil soluble dispersant additives, useful in fuel and lubricating oil compositions, including concentrates containing the additives, can be prepared by polymerizing a 6 to 10 membered lactone using as the initiator those lactone-reactive functions contained within the class of oil soluble Mannich base derivatives disclosed, for example, in U.S. Pat. No. 3,649,229.

While there are a number of prior art disclosures relating to Mannich base dispersants and to lactone polymerization reactions, in general, little or no prior art of direct pertinence appears to have surfaced in regard to the present dispersants. Exemplary of the patent literature which relates to lactone polymerization processes and/or to oil soluble Mannich base dispersant additives are the following U.S. Patents: U.S. Pat. No. 4,362,635 discloses synthetic ester oils which are esterification products of monoalcohols and dicarboxylic acids or of polyhydric alcohols and monocarboxylic acids respectively, containing 5 to 45% by weight of units of hydroxycarboxylic acids obtained from aliphatic alcohols, aliphatic, cycolaliphatic or aromatic carboxylic acids, and lactones of aliphatic $C_5$–$C_{12}$ hydroxycarboxylic acids. The synthetic ester oils are suitable for the preparation of lubricants and lubricant compositions.

U.S. Pat. No. 3,539,633 relates to oil soluble high molecular weight alkyl-hydroxybenzyl N-substituted amines which are useful as lube oil detergent-dispersant additives. The oil soluble additive products are prepared by condensation of a high molecular weight alkyl substituted phenol, a polyamino compound, formaldehyde, and an alkyl-substituted phenol whose alkyl substituent has 2 to 20,000 carbon atoms. The products may be borated, for example, by reaction with boric acid.

U.S. Pat. No. 3,741,896 relates to dispersant additives prepared by reacting a sulfurized alkylphenol with a Mannich base. The Mannich base is one that was prepared from formaldehyde, alkylphenol, and a lower alkyl monoamine.

U.S. Pat. No. 3,798,165 relates to oil soluble high molecular weight Mannich condensation products formed by reacting a high molecular weight alkyl-substituted hydroxy aromatic compound, whose alkyl-substitutent has a number average molecular weight of from about 600–100,000, an amine, and an aldehyde. The Mannich condensation products are said to be efficient ashless type (metal free) dispersant-detergent lubricant oil addition agents.

U.S. Pat. No. 4,379,914 and its continuation-in-part (U.S. Pat. No. 4,463,168) disclose the preparation of polycaprolactone polymers by reacting E-caprolactone with a diamine wherein one of the amine groups of the diamine is a tertiary amine and the other is a primary or secondary amine. The polycaprolactone polymers are disclosed as being useful for neutralizing certain sulfonic acid-containing polymers to form amine-neutralized sulfonated derivatives.

U.S. Pat. No. 3,169,945 discloses the preparation of lactone polyesters which are useful as plasticizers and as intermediates for preparing elastomers and foams. The polyesters can be prepared by reacting a lactone such as E-caprolactone with an initiator such as an alcohol, amine or amino alcohol.

U.S. Pat. No. 4,532,058 discloses as a motor oil dispersant, a spirolactone condensation product formed by heating alkenyl succinic anhydrides in the presence of a basic catalyst, and then heating the resulting bicyclic spirodilactone condensation product with a polyamine or polyamine alcohol. It should be emphasized that this patent describes the intermolecular decaboxylation of an alkenyl succinic anhydride at elevated temperatures to form a condensation product and carbon dioxide as a by-product. This prior art is not concerned with polymerizable lactones which are the subject of the instant invention.

U.S. Pat. No. 3,442,808 relates to lubricating oil additives prepared by reacting alkenyl succinic anhydride with the Mannich condensation product prepared by condensing alkyl substituted phenol, formaldehyde and polyalkylene polymaine.

U.S. Pat. No. 4,354,950 discloses a method of preparing Mannich base derivatives of hydroxyaryl succinimides of the formula

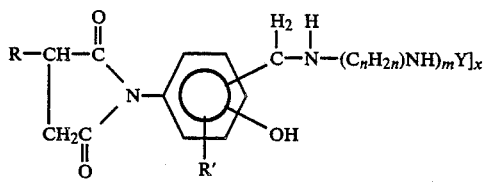

wherein R is hydrocarbyl of 25 to 200 carbons, R' is H, alkyl or halogen, "n" is 2 or 3, "m" has a value of 1 to 5, Y is H or a methylene hydroxyaryl succinimide radical, "x" has a value of 1 to 2 when Y is H and a value of 1 when Y is a methylene hydroxyarl succinimide radical. The above succinimides are formed in a stepwise reaction, e.g., by reacting a polyalkenyl succinic anhydride with an aminophenol, to produce an intermediate N-(hydroxyaryl) hydrocarbyl succinimide, which is then reacted with an alkylene diamine or polyalkylene polyamine and an aldehyde (e.g., formaldehyde) in a Mannich base reaction to produce the described succinimides. The described succinimides may be added to a base oil of lubricating viscosity to form lubricant concentrates and lubricating oil formulations.

U.S. Pat. No. 3,798,165 relates to oil soluble high molecular weight Mannich condensation products formed by reacting certain high molecular weight alkyl-substituted hydroxy aromatic compounds, with a compound containing at least a HN<group (e.g., an alkylene polyamine) and an aldehyde (e.g., formaldehyde).

U.S. Pat. No. 4,584,117 and its division (U.S. Pat. No. 4,624,681) disclose additives which are useful as dispersants in lubricating oils, gasolines, marine crankcase oils and hydraulic fluids. The additives are prepared by first reacting a polyamine with a cyclic carbonate to form an intermediate, followed by reaction of this intermediate with an alkenyl or alkyl succinic anhydride.

U.S. Pat. No. 4,585,566 relates to nitrogen-containing dispersant additives having at least one primary or secondary amine group which have been modified by treatment with a cyclic carbonate. Examples of the nitrogen-containing dispersants which are so modified include polyoxyalkylene polyamines, Mannich bases, borated Mannich bases and hydrocarbyl sulfonamides having at least one additional amino group.

U.S. Pat. No. 4,612,132 related additives which are useful as dispersants and lubricating oils, gasolines and the like. The additives polyamino alkenyl or alkyl succinimides which have been reacted with cyclic carbonates, linear mono- or polycarbonates, or chloroformate to introduce carbonate functionality.

U.S. Pat. No. 4,614,603 is directed to polyamino alkenyl or alkyl succinimides which have been modified by treatment with a thiolactam, lactam or thiolactone. The modified materials are useful as dispersants or detergents in lubricating oils.

U.S. Pat. No. 4,617,138 relates to polyamino alkenyl or alkyl succinimides which have been modified by treatment with a lactone to yield modified succinimides with a hydrocarbylcarbonylalkylene group. The modified succinimides are useful as dispersants in lubricating oils, gasolines, marine crankcase oils and hydraulic oils. The lactones which are disclosed as being suitable for treating the succinimides are limited to 2-hydrocarbyl-carbonyl substituted lactones which may be prepared, for example, by reacting an ester and a lactone, such as gamma butyrolactone or valerolactone in the presence of an organic or inorganic base.

European Pat. No. 202,024 relates to additives which are useful as dispersants in lubricating oils and hydrocarbon fuels and which are obtained by treating polyamino alkenyl or alkyl succinimides with a cyclic carbonate, thiocarbomate, or dithiocarbomate.

U.S. Pat. No. 4,645,515 discloses polyamine alkenyl or alkyl succinimides which have been modified by treatment with a lactone to yield polyamino alkenyl or alkyl succinimides wherein one or more of the basic nitrogens of the polyamino moiety is substituted with a hydroxyalkylene carbonyl group. The additives so disclosed are useful as dispersants in lubricating oils, gasolines, marine crank case oils and hydraulic oils.

U.S. Pat. No. 4,647,390 relates to additives which are useful as dispersants and detergents in lubricating oils and fuels. The additives are polyamino alkenyl or alkyl succinimides wherein one or more of the amino nitrogens of the succinimide is substituted with

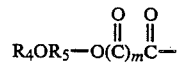

wherein $R_4$ is hydrocarbyl of from 1 to 30 carbon atoms; $R_5$ is hydrocarbyl of from 2 to 30 carbon atoms or $-R_6-(OR_6)_p-$, wherein $R_6$ is alkylene of 2 to 5 carbon atoms and p is an integer from 1 to 100; and m is an integer of from 0 to 1.

U.S. Pat. No. 4,663,062 discloses polyaminoalkenyl or alkyl succinimides which have been modified by treatment with a compound of the formula:

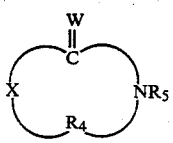

wherein W is oxygen or sulfur; X is oxygen or sulfur; $R_4$ is an alkylene group of from 2 to 3 carbon atoms or an alkylene group of from 2 to 3 carbon atoms substituted with from 1 to 3 alkyl groups of from 1 to 2 carbon atoms each; and $R_5$ is hydrogen or alkyl of from 1 to 20 carbon atoms. The modified polyamino alkenyl or alkyl succinimides possess dispersancy and detergency in lubricating oils and in fuels. Similar disclosures are contained in U.S. Pat. Nos. 4,666,459 and 4,666,460.

U.S. Pat. No. 4,668,246 relates to polyamino alkenyl or alkyl succinimides which have been modified by treatment with a lactone to yield polyamino alkenyl or alkyl succinimides wherein one or more of the basic nitrogens of the polyamino moiety is substituted with a hydrocarbylcarbonylalkylene group. The additives are useful as dispersants in lubricating oils, gasolines, marine crank case oils and hydraulic oils.

Additional exemplary prior art which is expressly incorporated herein by reference in its entirely is U.S. Pat. No. 4,615,826.

SUMMARY OF THE INVENTION

It is a principal object of this invention to provide a novel class of poly ($C_5$–$C_9$ lactone) adduct dispersants.

Another object is to provide a process for preparing a novel class of dispersants from $C_5$–$C_9$ lactones and Mannich base derivatives of high molecular weight hydrocarbyl-substituted hydroxy aromatic compounds which contain lactone-reactive amine functionality.

Another object is to provide a process for preparing novel classes of polymeric dispersants from $C_5$–$C_9$ lactones, di or polyamines, long chain hydrocarbyl-substituted hydroxy aromatic compounds and aldehydes.

Yet another object is to provide a process for preparing novel polymeric dispersants from $C_5$–$C_9$ lactones and the reaction product of a hydrocarbyl-substituted hydroxy aromatic compound, a di- or polyamine, and an aldehyde.

Still another object is to prepare novel polymeric dispersants by reacting a $C_5$–$C_9$ lactone with a di- or polyamine, followed by reaction with a hydrocarbyl-substituted hydroxy aromatic compound and an aldehyde.

Yet another object is to prepare poly ($C_5$–$C_9$ lactone) modified Mannich base adduct dispersants by reacting a $C_5$–$C_9$ lactone with a hydrocarbyl-substituted hydroxy aromatic compound followed by reaction with an amine and an aldehyde.

Another object is to provide a process for preparing novel poly ($C_5$–$C_9$ lactone) modified Mannich base adduct dispersants by reacting an amine with a $C_5$–$C_9$ lactone and an aldehyde to form an intermediate which is further reacted with a hydrocarbyl-substituted hydroxy aromatic compound.

A further object is to provide lubricant compositions and concentrates containing the novel poly ($C_5$–$C_9$ lactone) modified Mannich base adducts of this invention.

Yet another object is to provide a novel class of oil soluble polylactone modified Mannich base dispersants from polyalkylene substituted hydroxy aromatic compounds which have at least one lactone-reactive amino group in their structure.

Still another object is to provide poly ($C_5$–$C_9$ lactone) adducts from Mannich base derivatives of polyalkylene substituted hydroxy aromatic compounds which contain at least one lactone-reactive amino group, as well as lubricant compositions and concentrates containing such adducts.

Still another object is to provide metal complexes and other post-treated derivatives, e.g., borated derivatives, of the novel poly ($C_5$–$C_9$ lactone) modified Mannich base adducts of this invention, as well as lubricant compositions and concentrates containing such post-treated derivatives.

The manner in which these and other objects can be achieved will be apparent from the detailed description of the invention which appears hereinbelow.

In one aspect of this invention, one or more of the above objects can be achieved by initiating the polymerization of a $C_5$–$C_9$ lactone by means of an amino function contained in a Mannich base derivative of a polyolefin substituted hydroxy aromatic compound wherein the polyolefin has a number average molecular weight of about 300 to about 10,000.

In another aspect, one or more of the objects of this invention can be achieved by heating a $C_5$–$C_9$ lactone such as E-caprolactone at a temperature of at least about 80° C., and preferably from about 90° C., to about 180° C. with a Mannich base derivative which has been prepared by reacting an amine, an aldehyde and a polyalkylene substituted hydroxy aromatic compound, wherein the polyalkylene is characterized by a number average molecular weight of about 300–10,000; and, in a further aspect, one or more objects of this invention are achieved by providing poly ($C_5$–$C_9$ lactone) adducts produced by such a process.

One or more additional objects of this invention are achieved by reacting E-caprolactone with a Mannich base formed by reacting an aldehyde such as formaldehyde, with a polyamine such as ethylene diamine, and a polyalkylene-substituted hydroxy aromatic compound such as polyisobutylenephenol. This aspect of the invention can be illustrated by the following equations:

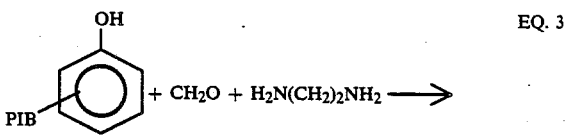

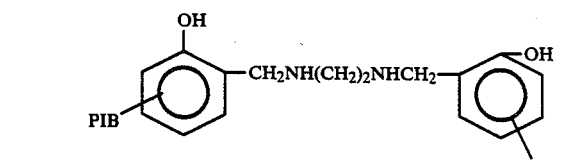

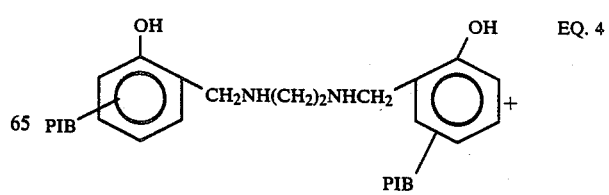

-continued

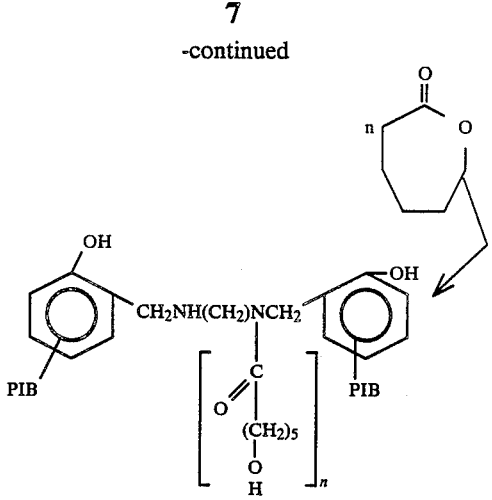

with a $C_5$-$C_9$ lactone to form a polylactone intermediate, followed by the reaction of the polylactone intermediate with an alkylene polyamine and an aldehyde, as follows:

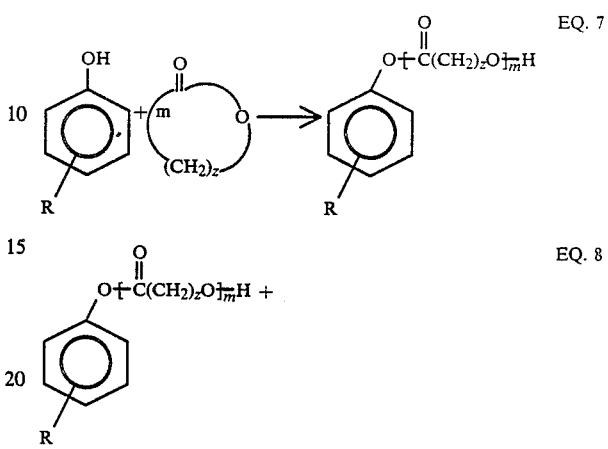
EQ. 7

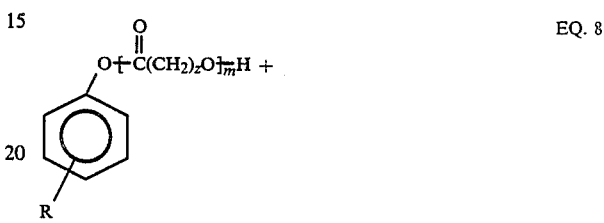
EQ. 8 where PIB represents polyisobutylene having a number average molecular weight of from about 700 to about 5,000, and n has an average value of about 0.2 to about 100, preferably from 1 to about 20, and most preferably from 1 to about 5.

The polymerization of the $C_5$-$C_{10}$ lactone, e.g. E-caprolactone as in Equation 4, can be conducted with or without a catalyst. However, it is generally preferred to employ a catalyst such as stannous octanoate in an amount of from about 100 to about 10,000 parts by weight of catalyst per one million parts of E-caprolactone.

One or more additional objects can be illustrated in connection with the reaction between E-caprolactone and an amine to form a polycaprolactone intermediate, followed by reaction of the intermediate with an aldhyde and a polyalkylene hydroxy aromatic compound, as follows:

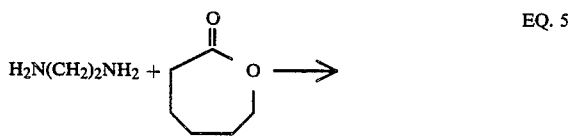
EQ. 5

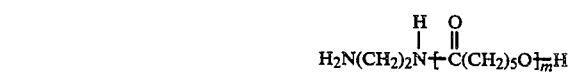
EQ. 6

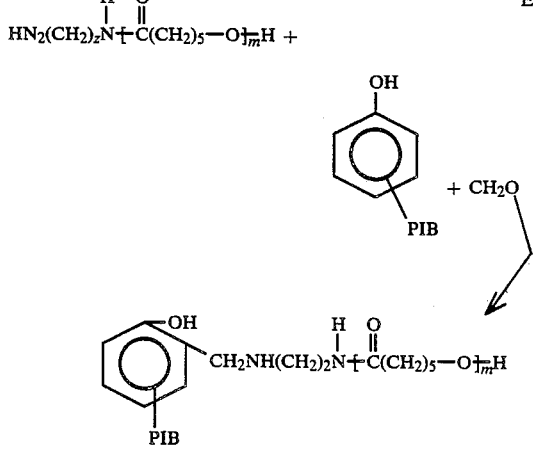

One or more additional objects of this invention can be illustrated in connection with the reaction of a hydroxarbyl substituted hydroxy aromatic compound

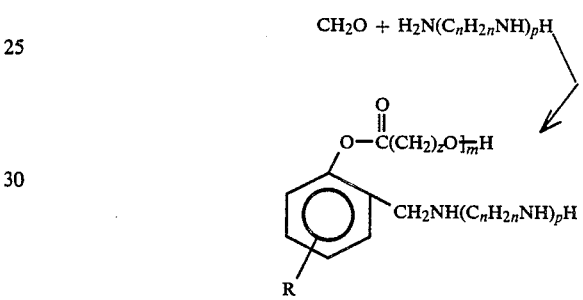

where n is a number from 1 to 4, p is a number from 1 to 7, z is a number from 4 to 8, m has an average value of about 0.2 to about 100, preferably from 1 to about 20, most preferably from 1 to about 5, R represents polyisobutylene having a number average molecular weight of from about 700 to about 5,000.

The novel poly ($C_5$-$C_9$ lactone) modified Mannich base adducts of this invention are useful per se as an additive, e.g. a dispersant additive, for example in the same manner as disclosed in U.S. Pat. No. 3,798,165 where prior art Mannich Condensation products of alkyl-substituted hydroxy aromatic compounds, amines and aldehydes are used as detergent-dispersant additives in lubricants, especially lubricants intended for use in the crankcase of internal conbustion engines. Accordingly, one or more objects of the invention are achieved by providing lubricating oil compositions, e.g. automatic transmission fluids, heavy duty oils suitable for use in the crankcases of gasoline and diesel engines, etc. containing the novel poly ($C_5$-$C_9$ lactone) adducts of this invention. Such lubricating oil compositions may contain additional additives such as viscosity index improvers, antioxidants, corrosion inhibitors, detergents, pour point depressants, antiwear agents, etc.

Still further objects are achieved by providing concentrate compositions comprising from about 10 to about 80 wt. % of a normally liquid, substantially inert, organic solvent/diluent, e.g. mineral lubricating oil, or other suitable solvent/diluent and from about 20 to about 90 wt. % of a poly ($C_5$-$C_9$ lactone) adduct, as mentioned above and described in more detail hereinafter.

DESCRIPTION OF THE PREFERRED EMBODIMENTS

The Hydrocarbyl-Substituted Hydroxy Aromatic Material

The hydrocarbyl substituted hydroxy aromatic compounds used in the invention include those compounds having the formula $$R'_b-Ar-(OH)_d \qquad \text{II}$$

wherein Ar represents

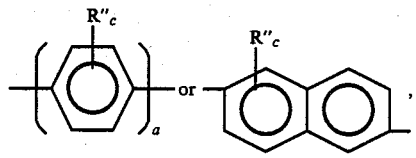

wherein a is 1 or 2, R' is a long chain hydrocarbon R" is a hydrocarbon or substituted hydrocarbon radical having from 1 to about 3 carbon atoms or a halogen radical such as the bromide or chloride radical, b is an integer from 1 to 2, c is an integer from 0 to 2, and d is an integer from 1 to 2.

Illustrative of such Ar groups are phenylene, biphenylene, naphthylene and the like.

The preferred long chain hydrocarbon substituents are olefin polymers comprising a major molar amount of $C_2$ to $C_{10}$, e.g. $C_2$ to $C_5$ monoolefin. Such olefins include ethylene, propylene, butylene, pentene, octene-1, styrene, etc. The polymers can be homopolymers such as polyisobutylene, as well as copolymers of two or more of such olefins such as copolymers of: ethylene and propylene; butylene and isobutylene; propylene and isobutylene; etc. Other copolymers include those in which a minor molar amount of the copolymer monomers, e.g., a copolymer of isobutylene and butadiene; or a copolymer of ethylene, propylene and 1,4-hexadiene; etc.

In some cases, the olefin polymer may be completely saturated, for example an ethylene-propylene copolymer made by a Ziegler-Natta synthesis using hydrogen as a moderator to control molecular weight.

The olefin polymers will usually have a number average molecular weight ($\bar{M}_n$) within the range of about 700 and about 10,000, more usually between about 700 and about 5,000. Particularly useful olefin polymers have a number average molecular weight within the range of about 700 to about 3000, and more preferably within the range of about 900 to about 2,500 with approximately one terminal double bond per polymer chain. An especially useful starting material for a highly potent dispersant additive made in accordance with this invention is polyisobutylene. The number average molecular weight for such polymers can be determined by several known techniques. A convenient method for such determination is by gel permeation chromatography (GPC) which additionally provides molecular weight distribution information, see W. W. Yau, J. J. Kirkland and D. D. Bly, "Modern Size Exclusion Liquid Chromatography", John Wiley and Sons, N.Y., 1979.

Processes for substituting the hydroxy aromatic compounds with the olefin polymer are known in the art and may be depicted as follows;

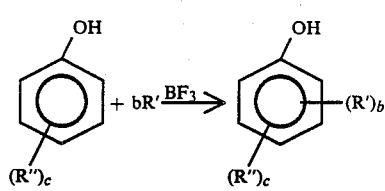
EQ. 11 where R', R", b and c are as previously defined, and $BF_3$ is an alkylating catalyst. Processes of this type are described, for example, in U.S. Pat. No. 3,539,633 and 3,649,229, the disclosures of which are incorporated herein by reference.

Representative hydrocarbyl substituted hydroxy aromatic compounds contemplated for use in the present invention include, but are not limited to, 2-polypropylene phenol, 3-polypropylene phenol, 4-polypropylene phenol, 2-polybutylene phenol, 3-polyisobutylene phenol, 4-polyisobutylene phenol, 4-polyisobutylene-2-chlorophenol, 4-polyisobutylene-2-methylphenol, and the like.

Suitable hydrocarbyl-substituted polyhydroxy aromatic compounds include the polyolefin catechols, the polyolefin resorcinols, and the polyolefin hydroquinones, e.g., 4-polyisobutylene-1,2-dihydroxybenzene, 3-polypropylene-1,2-dihydroxybenzene, 5-polyisobutylene-1,3-dihydroxybenzene, 4-polyamylene-1,3-dihydroxybenzene, and the like.

Suitable hydrocarbyl-substituted naphthols include 1-polyisobutylene-5-hydroxynaphthalene, 1-polypropylene-3-hydroxynaphthalene and the like.

The preferred long chain hydrocarbyl substituted hydroxy aromatic compounds to be used in this invention can be illustrated by the formula:

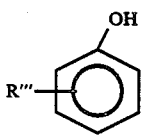
III wherein R''' is hydrocarbyl of from 50 to 300 carbon atoms, and preferably is a polyolefin derived from a $C_2$ to $C_{10}$ (e.g., $C_2$ to $C_5$) mono-alpha-olefin.

The Amine Material

The amines which are useful in the present invention are those which can be reacted simultaneously with an aldehyde, such as formaldehyde, in the Mannich base reaction.

Useful amine compounds in the Mannich base reaction include polyamines of about 2 to 60, e.g., 3 to 20, most preferably 3 to 10, total carbon atoms in the molecule. These amines may be hydrocarbyl amines or may be hydrocarbyl amines including other noninterfering groups, e.g., alkoxy groups, amide groups, nitrile groups, imidazoline groups, and the like. Preferred amines are aliphatic saturated amines, including those of the general formula:

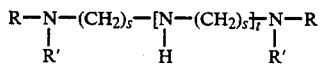   IV wherein R and R' are independently selected from the group consisting of hydrogen; $C_1$ to $C_{25}$ straight or branched chain alkyl radicals; $C_1$ to $C_{12}$ alkoxy $C_2$ to $C_6$ alkylene radicals; and $C_1$ to $C_{12}$ alkylamino $C_2$ to $C_6$ alkylene radicals; each s is the same or a different number of from 2 to 6, preferably 2 to 4; and t is a number of from 0 to 10, preferably 2 to 7. If t=0, then at least one of R or $R^1$; must be H such that there are at least two of either primary or secondary amino groups.

Non-limiting examples of suitable amine compounds include: 1,2-diaminoethane; 1,3-diaminopropane; 1,4-diaminobutane; 1,6-diaminohexane; polyethylene amines such as diethylene triamine; triethylene tetramine; tetraethylene pentamine; polypropylene amines such as 1,2-propylene diamine; di-(1,2-propylene) triamine; di-(1,3-propylene) triamine; N,N-dimethyl-1,3-diaminopropane; N,N-di-(2-aminoethyl) ethylene diamine; N-dodecyl-1,3-propane diamine; di-, and tri-tallow amines; amino morpholines such as N-(3-aminoproply) morpholine; etc.

Other useful amine compounds include, for example: alicylic diamines such as 1,4-di(aminomethyl) cyclohexane, and heterocyclic compounds such as morpholines, imidazolines, and N-aminolakyl piperazines of the general formula:

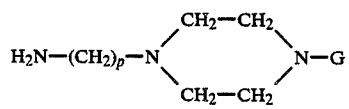   V wherein G is independently selected from the group consisting of hydrogen and omega-(non-tertiary)aminoalkylene radicals of from 1 to 3 carbon atoms, and p is a number of from 1 to 4. Non-limiting examples of such amines include 2-pentadecyl imidazoline; N-(2-aminoethyl) piperazine; etc.

Commercial mixtures of amine compounds advantageously may be used. For example, one process for preparing alkylene amines involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetramine, tetraethylene pentamine and isomeric piperazines. A low cost mixture of poly(ethyleneamines) compounds averaging about 5 to 7 nitrogen atoms per molecule are available commercially under trade names such as "Polyamine H", "Polyamine 400", "Dow Polyamine E-100", etc.

Useful amines also include polyoxalkylene polyamines such as those of the formulas:

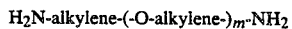   VI where m has a value of about 3 to 70 and preferably 10 to 35; and

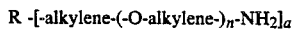   VII where n has a value of about 1 to 40 with the proviso that the sum of all the n's is from about 3 to about 70 and preferably from about 6 to about 35, R is a polyvalent saturated hydrocarbon radical of up to ten carbon atoms, and "a" is a number from 3 to 6. The alkylene groups in either formula VI or VII may be straight or branched chain containing about 2 to 7, and preferably about 2 to 4 carbon atoms.

The above polyoxyalkylene polyamines, preferably polyoxyalkylene diamines and polyoxyalkylene triamines, may have average molecular weights ranging from about 200 to about 4,000 and preferably from about 400 to about 2,000. The preferred polyoxyalkylene polyamines include the polyoxyethylene and polyoxypropylene diamines and the polyoxypropylene triamines having average molecular weight ranging from about 200 to 2,000. The polyoxyalkylene polyamines are commercially available and may be obtained, for example, from the Jefferson Chemical Company, Inc. under the trade name "Jeffamines D-230, D-400, D-1000, D-2000, T-403", etc.

The Aldehyde Material

The aldehyde material which can be employed in this invention is represented by the formula:

   VIII in which R is a hydrogen or an aliphatic hydrocarbon radical having from 1 to 4 carbon atoms. Examples of suitable aldehydes include formaldehyde, paraformaldehyde, acetaldehyde and the like.

The Lactone Material

Useful lactone compounds for the process of this invention include those lactones having at least five carbon atoms in the lactone ring, e.g. 5 to 9 carbon atoms. Such lactones are capable of undergoing ring opening polymerization by reaction with an amine group or a hydroxy group. The lactones may be substituted or unsubstituted and the subtituents, if any, may comprise, for example, $C_1$ to $C_{25}$ straight or branched chain alkyl; aryl, aralkyl, or cycloalkyl having 6 to 60 total carbon atoms; $C_1$ to $C_{12}$ alkoxy or other groups which would not interfere with the ring opening reaction and adduct formation. The preferred lactones have no more than two substituent groups, and the more preferred lactones are unsubstituted.

Non-limiting examples of the useful lactone include delta-valerolactone, methyl-delta-valerolactone, E-caprolactone, methyl-E-caprolactone, dimethyl-E-caprolactone, methoxy-E-caprolactone, cyclohexyl-E-caprolactone, methylbenzyl-E-caprolactone, caprylolactone, methyl-caprylolactone, and the like, with E-caprolactone being particularly preferred.

The ring opening polymerization of the lactone by reaction with a hydroxy group or an amine group-containing material may be carried out, with or without a catalyst, simply by heating a mixture of the lactone and the hydroxy group or amine group-containing material in a reaction vessel in the absence of a solvent at a temperature of from about 30° C. to about 200° C., more preferrably at a temperature of about 75° C. to about 180° C., and most preferably about 90° to about 160° C., for a sufficient period of time to effect polymerization. Optionally, a solvent for the monomer and/or polymer can be employed to control viscosity and/or reaction rates.

PREPARATION OF THE LACTONE POLYMERS

Dispersants

In one preferred aspect of this invention, the novel poly($C_5$–$C_9$ lactone) adducts are prepared by first reacting the long chain hydrocarbyl-substituted hydroxy aromatic material with a polyfunctional amine and an aldehyde in the Mannich base reaction. In general, the reactants are admixed and reacted at an elevated temperature until the reaction is complete. This reaction may be conducted in the presence of a solvent and in the presence of a quantity of mineral oil which is an effective solvent for the hydrocarbyl-substituted hydroxy aromatic compound and for the finished Mannich base. This Mannich base has been illustrated above (Equation 3) for the reaction between polyisobutylene phenol, formaldehyde and ehtylene diamine.

In the second step of the poly($C_5$–$C_9$ lactone) adduct formation, in accordance with this aspect of the invention, the intermediate formed by the Mannich base reaction in Equation 3 is capped with a lactone polymer using at least one residual amine functionality on the intermediate as the ring opening and polymerization initiator. This final step has been illustrated (Equation 4) when the a $C_5$–$C_9$ lactone, E-caprolactone, has been opened and polymerized by means of a secondary amine functionality on the Mannich base intermediate.

In another preferred aspect of the invention, the poly($C_5$–$C_9$ lactone) adducts are prepared by using the hydroxy functionality on the hydrocarbyl-substituted hydroxy aromatic compound to open and polymerize te $C_5$–$C_9$ lactone and thereby form an intermediate, which intermediate is then admixed and reacted with the amine material and the aldehyde in the Mannich base reaction. The overall reaction scheme of this aspect of the invention has been illustrated above in Equations 7 and 8.

In still other aspects of the invention, the order of reacting the various reactants is modified such that, for example, the $C_5$–$C_9$ lactone is first admixed and reacted with the amine material and the aldehyde, whereafter the resulting poly ($C_5$–$C_9$ lactone) intermediate adduct is reacted with the hydrocarbyl-substituted hydroxy aromatic compound. The sequence of reactions performed in accordance with this aspect of the invention has been illustrated above in Equations 9 and 10.

Catalysts useful in the promotion of the above-identified reactions are selected from the group consisting of stannous octanoate, stannous hexanoate, stannous oxalate, tetrabutyl titanate, a variety of metal organic based catalysts, acid catalysts and amine catalysts, as described on page 266, and forward in a book chapter authored by R. D. Lundberg and E. F. Cox entitled, "Kinetics and Mechanisms of Polymerization: Ring Opening Polymerization"; edited by Frisch and Reegen, published by Marcel Dekker in 1969, wherein stannous octanoate is an especially preferred catalyst. The catalyst may be added to the reaction mixture at any effective concentration level. However, the catalyst generally is added at a concentration level of about 50 to about 10,000 parts of catalyst per one million parts by weight of total reaction mixture.

When initiating the polymerization of the lactone monomer under the conditions described herein, the lactone will react selectively first with primary amino groups present in the initiator molecule and form a polymer adduct containing the polylactone ester group and a terminal hydroxyl group. In the absence of a catalyst, any excess lactone monomer will either react with a secondary amino group present in the initiator molecule or with the hydroxyl group formed via the reaction of the lactone with the primary amino groups. In the presence of a catalyst, such as stannous octanoate, it is believed that the lactone preferably will react somewhat more readily with the terminal hydroxyl group than with a secondary amino group thus producing a polylactone ester adduct. If the stoichiometry of the initiator is such that very few primary amino groups are available, secondary amino groups will be converted to polylactone adducts. This preferance towards reaction with the primary amino groups results in an added benefit in those specific applications where the presence of primary amines is considered to be deleterious to performance (such as in diesel dispersancy). In those cases, the present invention provides a means for replacing the deleterious amine group with an amide function and a desirable hydroxyl group.

In the reactions shown above, the value of m or the average degree of polymerization (DP) of the lactone monomers may vary depending upon the intended application. At DP's of much greater than about 10, e.g., greater than about 50, the polylactone adducts can exhibit crystallinity; a characteristic which is undesirable in an oil soluble dispersant due to the consequent high viscosity or even solid, oil products which can be obtained. However, at lower DP's, oil soluble adducts posessing low viscosity and desirable sludge and varnish inhibition charateristics are obtained. Accordingly, regardless of the identity of the lactone, the average degree of polymerization (DP) of the lactone modified, Mannich base dispersant additives of this invention should be between about 0.2 and about 100, more preferably between about 1 and about 50, and most preferably between about 1 and about 20.

Further aspects of the present invention reside in the formation of metal complexes and other post-treatment derivatives, e.g., borated derivatives, of the novel additives prepared in accordance with this invention. Suitable metal complexes may be formed in accordance with known techniques of employing a reactive metal ion species during or after the formation of the present $C_5$–$C_9$ lactone derived dispersant materials. Complex-forming metal reactants include the nitrates, thiocyanates, halides, carboxylates, phosphates, thio-phosphates, sulfates, and borates of transition metals such as iron, cobalt, nickel, copper, chromium, manganese, molybdenum, tungsten, ruthenium, palladium, platinum, cadmium, lead, silver, mercury, antimony and the like. Prior art disclosures of these complexing reactions may be found, for example, in U.S. Pat. No. 3,306,908 and Re. 26,433.

Post-treatment compositions include those formed by reacting the novel additives of the present invention with one or more post-treating reagents, usually selected from the group consisting of boron oxide, boron oxide hydrate, boron halides, boron esters, boron acids, sulfur, sulfur chlorides, phosphorous sulfides and oxides, carboxylic acid or anhydride acylating agents, epoxides and episulfides and acrylonitriles. The reaction of such post-treating agents with the novel additives of this invention is carried out using procedures known in the art. For example, boration may be accomplished in accordance with the teachings of U.S. Pat. Nos. 3,254,025 or 3,539,633 by treating the $C_5$–$C_9$ lactone derived additive compound with a boron oxide, halide, ester or acid. Treatment may be carried out by adding about 1–3 wt. % of the boron compound, preferably boric acid, and heating and stirring the reaction mixture at about 135° C. to 165° C. for 1 to 5 hours followed by nitrogen stripping and filtration, if desired. Mineral oil or inert organic solvents facilitate the process.

THE COMPOSITIONS

The lactone modified, Mannich base adducts of the present invention have been found to possess very good dispersant properties as measured herein in a wide variety of environments.

Accordingly, the lactone modified, Mannich base adducts are used by incorporation and dissolution into an oleaginous material such as fuels and lubricating oils.

When the dispersant adducts of this invention are used in normally liquid petroleum fuels such as middle distillates boiling from about 150° to 800° F., including kerosene, diesel fuels, home heating fuel oil, jet fuels, etc., a concentration of the additive in the fuel in the range of typically from about 0.001 to about 0.5, and preferably 0.001 to about 0.1 weight percent, based on the total weight of the composition, will usually be employed.

The lactone modified, Mannich base dispersants find their primary utility in lubricating oil compositions which employ a base oil in which the additives are dissolved or dispersed.

Such base oils may be natural or synthetic although the natural base oils will derive a greater benefit.

Thus, base oils suitable for use in preparing lubricating compositions of the present invention include those conventionally employed as crankcase lubricating oils for spark-ignited and compression-ignited internal combustion engines, such as automobile and truck engines, marine and railroad diesel engines, and the like. Advantageous results also are achieved by employing the dispersant additives of the present invention in base oils conventionally employed in and/or adapted for use as power transmitting fluids such as automatic transmission fluids, tractor fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

Thus, the additives of the present invention may be suitably incorporated into synthetic base oils such as alkyl esters of dicarboxylic acids, polyglycols and alcohols, polyalphaolefins, alkyl benzenes, organic esters of phosphoric acids, polysilicone oils, etc.

Natural base oils include mineral lubricating oils which may vary widely as to their crude source, e.g., whether paraffinic, naphthenic, mixed, paraffinic-naphthenic, and the like; as well as to their formation, e.g., distillation range, straight run or cracked, hydrofined, solvent extracted and the like.

More specifically, the natural lubricating oil base stocks which can be used in the compositions of this invention may be straight mineral lubricating oil or distillates derived from paraffinic, naphthenic, asphaltic, or mixed base crudes, or, if desired, various blends oils may be employed as well as residuals, particularly those from which asphaltic constituents have been removed. The oils may be refined by conventional methods using acid, alkali, and/or clay or other agents such as aluminum chloride, or they may be extracted oils produced, for example, by solvent extraction with solvents of the type of phenol, sulfur dioxide, furfural, dichlorodiethyl ether, nitrobenzene, crotonaldehyde, molecular sieves, etc.

The lubricating oil base stock conveniently has a viscosity of typically about 2.5 to about 12, and preferably about 2.5 to about 9 cs. at 100° C.

Thus, the lactone modified, Mannich base additives of the present invention can be employed in a lubricating oil composition which comprises lubricating oil, typically in a major amount, and the dispersant additive, typically in a minor amount, which is effective to impart enhanced dispersancy, relative to the absence of the additive. Additional conventional additives selected to meet the particular requirements of a selected type of lubricating oil composition can be included as desired.

The dispersants of this invention are oil-soluble, dissolvable in oil with the aid of a suitable solvent, or are stably dispersible materials. Oil-soluble, dissolvable, or stably dispersible as that terminology is used herein does not necessarily indicate that the materials are soluble, dissolvable, miscible, or capable of being suspended in oil in all proportions. It does mean, however, that the dispersant additives, for instance, are soluble or stably dispersible in oil to an extent sufficient to exert their intended effect in the environment in which the oil is employed. Moreover, the additional incorporation of other additives may also permit incorporation of higher levels of a particular dispersant, if desired.

Accordingly, while any effective amount of the dispersant additives can be incorporated into the lubricating oil composition, it is contemplated that such effective amount be sufficient to provide said lube oil composition with an amount of the additive of typically from about 0.10 to about 15 e.g., 0.1 to 10, and preferably from about 0.1 to about 7 wt. %, based on the weight of said composition.

The dispersant additives of the present invention can be incorporated into the lubricating oil in any convenient way. Thus, they can be added directly to the oil by dispersing, or dissolving the same in the oil at the desired level of concentration typically with the aid of a suitable solvent such as toluene, or tetrahydrofuran. Such blending can occur at room temperature or elevated temperatures. Alternatively, the dispersant additives may be blended with a suitable oil-soluble solvent and base oil to form a concentrate, and then blending the concentrate with lubricating oil base stock to obtain the final formulation. Concentrates will typically contain from about 20 to about 60 wt. %, by weight dispersant additive, and typically from about 80 to about 20%, preferably from about 60 to about 20% by weight base oil, based on the concentrate weight.

The lubricating oil base stock for the dispersant additives of the present invention typically is adapted to perform a selected function by the incorporation of additives therein to form lubricating oil compositions (i.e., formulations).

Representative additives typically present in such formulations include viscosity modifiers, corrosion inhibitors oxidation inhibitors, friction modifiers, other dispersants, anti-foaming agents, anti-wear agents, pour point depressants and the like.

Viscosity modifiers impart high and low temperature operability to the lubricating oil and permit it to remain shear stable at elevated temperatures and also exhibit acceptable viscosity or fluidity at low temperatures.

Viscosity modifiers are generally high molecular weight hydrocarbon polymers including polyesters.

The viscosity modifiers may also be derivatized to include other properties or functions, such as the addition of dispersancy properties.

These oil soluble viscosity modifying polymers will generally have number average molecular weights of from $10^3$ to $10^6$, preferably $10^4$ to $10^6$, e.g., 20,000 to 250,000, as determined by gel permeation chromatography or membrane osmometry.

Representative examples of suitable viscosity modifiers are any of the types known to the art including polyisobutylene, copolymers of ethylene and propylene, polymethacrylates, methacrylate copolymers, copolymers of an unsaturated dicarboxylic acid and vinyl compound and interpolymers of styrene and acrylic esters.

Corrosion inhibitors, also known as anti-corrosive agents, reduce the degradation of the metallic parts contacted by the lubricating oil composition. Illustrative of corrosion inhibitors are zinc dialkyldithiophosphate, phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such as polyisobutylene, with from 5 to 30 wt. % of a sulfide of phosphorus for ½ to 15 hours, at a temperature in the range of 150° to 600° F. Neutralization of the phosphosulfurized hydrocarbon may be effected in the manner taught in U.S. Pat. No. 1,969,324.

Oxidation inhibitors reduce the tendency of mineral oils to deteriorate in service which deterioration is evidenced by the products of oxidation such as sludge and varnished-like deposits on the metal surfaces. Such oxidation inhibitors include alkaline earth metal salts of alkylphenolthioesters having preferably $C_5$ to $C_{12}$ alkyl side chains, e.g., calcium nonylphenol sulfide, barium t-octylphenyl sulfide, dioctylphenylamine, phenylalphanaphthylamine, phosphosulfurized or sulfurized hydrocarbons, etc.

Friction modifiers serve to impart the proper friction characteristics to lubricating oil compositions such as automatic transmission fluids.

Representative examples of suitable friction modifiers are found in U.S. Pat. No. 3,933,659 which discloses fatty acid esters and amides; U.S. Pat. No. 4,176,074 which describes molybdenum complexes of polyisobutenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U.S. Pat. No. 3,778,375 which discloses reaction products of a phosphonate with an oleamide; U.S. Pat. No. 3,852,205 which discloses S-carboxyalkylene hydro-carbyl succinimide, S-carboxyalkylene hydrocarbyl succinamic acid and mixtures thereof; U.S. Pat. No. 3,879,306 which discloses N-(hydroxyalkyl)alkenyl-succinamic acids or succinimides; U.S. Pat. No. 3,932,290 which discloses reaction products of di-(lower alkyl) phosphites and epoxides; and U.S. Pat. No. 4,028,258 which discloses the alkylene oxide adduct of phosphosulfurized N-(hydroxyalkyl) alkenyl succinimides. The disclosures of the above references are herein incorporated by reference. The most preferred friction modifiers are succinate esters, or metal salts thereof, of hydrocarbyl substituted succinic acids or anhydrides and thiobis alkanols such as described in U.S. Pat. No. 4,344,853, disclosure of this patent also being herein incorporated by reference.

Dispersants maintain oil insolubles, resulting from oxidation during use, in suspension in the fluid thus preventing sludge flocculation and precipitation or deposition on metal parts. Suitable dispersants include high molecular weight alkyl succinates, the reaction product of oil-soluble polyisobutylene succinic anhydride with ethylene amines such as tetraethylene pentamine and borated salts thereof.

Pour point depressants lower the temperature at which the fluid will flow or can be poured. Such depressants are well known. Typically of those additives which usefully optimize the low temperature fluidity of the fluid are $C_8$–$C_{18}$ dialkylfumarate vinyl acetate copolymers, polymethacrylates, and wax naphthalene. Foam control can be provided by an antifoamant of the polysiloxane type, e.g., silicone oil and polydimethyl siloxane.

Anti-wear agents, as their name implies, reduce wear of metal parts. Representatives of conventional antiwear agents are zinc dialkyldithiophosphate, zinc diaryldithiosphate and magnesium sulfonate.

Detergents and metal rust inhibitors include the metal salts of sulphonic acids, alkyl phenols, sulfurized alkyl phenols, alkyl salicylates, naphthenates and other oil soluble mono- and dicarboxylic acids. Highly basic (viz, overbased) metal salts, such as highly basic alkaline earth metal sulfonates (especially Ca and Mg salts) are frequently used as detergents. Representative examples of such materials, and their methods of preparation, are found in co-pending Ser. No. 754,001, filed Jul. 11, 1985, the disclosure of which is hereby incorporated by reference.

Some of these numerous additives can provide a multiplicity of effects, e.g., a dispersant-oxidation inhibitor. This approach is well known and need not be further elaborated herein.

Compositions when containing these conventional additives are typically blended into the base oil in amounts which are effective to provide their normal attendant function. Representative effective amounts of such additives are illustrated as follows:

| Additive | Broad Wt. % a.i. | Preferred Wt. % a.i. |
|---|---|---|
| Viscosity Modifier | .01–12 | .01–4 |
| Corrosion Inhibitor | 0.01–5 | .01–1.5 |
| Oxidation inhibitor | 0.01–1 | .01–1.5 |
| Dispersant | 0.1–20 | 0.1–8 |
| Pour Point Depressant | 0.1–5 | .01–1.5 |
| Anti-Foaming Agents | 0.001–3 | .001–0.15 |
| Anti-Wear Agents | 0.001–5 | .001–1.5 |
| Friction Modifiers | 0.01–5 | .01–1.5 |
| Detergents/Rust Inhibitors | .01–20 | .01–3 |
| Mineral Oil Base | Balance | Balance |

When other additives are employed, it may be desirable, although not necessary, to prepare additive concentrates comprising concentrated solutions or dispersions of the dispersant (in concentrate amounts hereinabove described), together with one or more of said other additives (said concentrate when constituting an additive mixture being referred to herein as an additive-package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the dispersant additive and optional additional additives in proper amounts to provide the desired concentration in the final formulation when the additive-package is combined with a predetermined amount of base lubricant. Thus, the dispersant of the present invention can be added to small amounts of base oil or other compatible solvents along with other desirable additives to form additive-packages containing active ingredients in collective amounts of typically from about 2.5 to about 90%, and preferably from about 5 to about 75%, and most preferably from about 8 to about 50% by weight additives in the appropriate proportions with the remainder being base oil.

The final formulations may employ typically about 10 wt. % of the additive-package with the remainder being base oil.

All of said weight percents expressed herein are based on active ingredient (A.I.) content of the additive, and/or upon the total weight of any additive-package, or formulation which will be the sum of the A.I. weight of each additive plus the weight of total oil or diluent.

This invention will be further understood by reference to the following examples, wherein all percentages and parts are percentages and parts by weight and all molecular weights are number average molecular weights unless otherwise noted, and which include preferred embodiments of the invention.

EXAMPLE 1

Part A (PIB-Phenol-1300 MW)

About 292 g (3.17 mole) of phenol and one liter of chlorobenzne were charged into a five liter, four-necked, round-bottomed reaction flask and stirred at room temperature under a nitrogen blanket. Thereafter 10.4 g of $BF_3$ was bubbled through the solution at a rate of 0.5 g/min. to form the $BF_3$-phenol complex. While stirring at room temperature, 1650 g of a polyisobutylene ($\overline{Mn}=1256$) (PIB) was added to the reaction mixture in one hour. The temperature of the reaction was raised to 40° C. and soaked at this temperature for two hours. The reaction mixture was then allowed to cool down to room temperature for about one hour. Ammonia gas was then bubbled through to neutralize the $BF_3$ as indicated by a pH paper. The product was vacuum stripped at 100° C. at 9 mm Hg to remove unreacted phenol and chlorobenznene. The residue was then filtered. It was analyzed for 78.2 wt % PIB-phenol active ingredient, a hydroxyl number of 29.2 and a kinematic viscosity of 538 cs at 100° C.

Part B

To 740 g of the polyisobutylene phenol of Part A (diluted to 50 wt. % ai with 511 g of S150N solvent neutral mineral oil having a viscosity of about 150 SSU at 100° C.) there was added 85.7 g of a commercial grade of poly(ethyleneamine) which was a mixture of poly(ethyleneamines) averaging about 5 to 7 nitrogen per molecule, hereinafter referred to as PAM, and 19.98 g of paraformaldehyde. The reaction mixture was heated at 80° C. for one hour under nitrogen atmosphere. The reaction mixture was then heated at 120° C. while stripping with nitrogen. The resulting product was filtered and collected. The product analyzed for 2.13 wt/% nitrogen and a kinematic viscosity of 168 cst. at 100° C.

EXAMPLE 2

About 200 g of the product prepared in accordance with EXAMPLE 1, Part B, were mixed in a reaction flask with 2 g of E-caprolactone (CL) and 0.1 g of stannous octanoate ($SnOct_2$). The reaction mixture was then heated at 160° C. for 4 hours while under a nitrogen blanket. The reaction product was filtered and collected, and was analyzed for 1.84 wt. % nitrogen and a kinematic viscosity of 191.4 cst. at 100° C.

EXAMPLE 3

The procedure of EXAMPLE 2 was repeated, except that 4 g of CL were reacted with the product of EXAMPLE 1, Part B. The resulting product analyzed for 1.79 wt. % nitrogen and a kinematic viscosity of 207.6 cst. at 100° C.

EXAMPLE 4

Part A (PIB-Phenol-900 MW)

About 156 g (1.66 mole) of phenol and one liter of chlorobenzene were added to a five liter, four-necked, round-bottomed flask and stirred at room temperature while 5.57 g of $BF_3$ was bubbled through at a rate of 0.5 g/min. Then 1500 g of polyisobutylene ($\overline{Mn}=2250$) was added during a period of one hour. The solution was stirred at room temperature for three hours and the temperature was raised to 40° C. for two hours. The reaction mixture was then allowed to cool down to room temperature and neutralized by bubbling through ammonia gas. Vacuum was applied and the unreacted phenol and chlorobenzene were distilled off at 100° C. and 9 mm Hg. The residue was then filtered. It analyzed for 63.4 wt. % PIB-phenol active ingredient.

Part B

To 500 g. of the polyisobutenyl phenol prepared in accordance with Part A of this example (diluted to 50 wt. % ai with 433 g S150N oil) there were added 43.3 g of PAM and 20.3 g of paraformaldehyde. The reaction mixture was then heated 80° C. for one hour, and then at 120° C. for 2 hours while stripping with nitrogen. The resulting product was filtered, collected and analyzed for 1.47 wt. % nitrogen.

EXAMPLE 5

About 150 g of the Mannich base product prepared in EXAMPLE 4 were mixed with 0.75 g CL and 0.1 g of Stannous octanoate and the mixture was heated at 160° C. for 4 hours. The product was then nitrogen stripped, filtered and analyzed for 1.51 wt. % nitrogen.

EXAMPLE 6

The procedure of EXAMPLE 5 was repeated, except that 1.50 g CL were used. The product analyzed for 1.51 wt % nitrogen.

Sludge Inhibition and Varnish Inhibition Bench Tests

Samples of the dispersant adducts prepared as set forth in EXAMPLES 1-6 were subjected to a standard sludge inhibition bench test (SIB) and a standard varnish inhibition bench test (VIB).

The SIB and VIB tests forecast the performance of a lubricant in a gasoline engine. These tests are described below:

The SIB test employs a used crankcase mineral lubricating oil composition having an original visocity of about 325 SSU at 37.8° C. that has been used in a taxicab driven generally for short trips only thereby causing a build up of a high concentration of sludge precursors. The oil used contains only a refined base mineral oil, a viscosity index improver, a pour point depressant and a zinc dialkyldithiophosphate anti-wear additive. The oil contains no sludge dispersants. Such used oil is acquired by draining and refilling taxicab crankcases at about 1,000–2,000 mile intervals.

The SIB test is conducted in the following manner: The used crankcase oil is freed of sludge by centrifuging for one half hour at about 39,000 gravities (gs). The resulting clear bright red oil is then decanted from the insoluble sludge particles. However, the supernatant oil still contains oil-soluble sludge precursors which, under the conditions employed by this test, will tend to form additional oil-insoluble deposits of sludge. The sludge inhibiting properties of the additives being tested are determined by adding to portions of the used oil 0.5 wt. %, on an active basis, of the particular additive being tested. Ten grams of each oil sample being tested is placed in a stainless steel centrifuge tube and is heated at 140° C. for 16 hours in the presence of air. Following the heating, the tube containing the oil being tested is cooled and then centrifuged for 30 minutes at about 39,000 gs. Any deposits of new sludge that form in this step are separated from the oil by decanting supernatant oil and then carefully washed with 15 ml. of pentane to remove all remaining oils from the sludge. The weight, in milligrams, of the new solid sludge that forms in the test is determined by drying the residue and weighing it. The results are reported as milligrams of sludge per ten grams of oil, thus measuring differences as small as one part per ten thousand. The less new sludge formed, the more effective is the additive as a dispersant. In other words, if the additive is effective, it will hold at least a portion of the new sludge that forms on heating and oxidation, stably suspended in the oil so that it does not precipitate during the centrifuging period.

In the VIB Test, a test sample consisting of ten grams of lubricating oil containing 0.5 wt. %, on an active basis, of the additive being evaluated is used. The test oil is a commercial lubricating oil obtained from a taxi after about 2000 miles of driving with said lubricating oil. Each sample is heat soaked overnight at about 140° C. and thereafter centrifuged to remove the sludge. The supernatant fluid of each sample is subjected to heat cycling from about 150° C. to room temperature over a period of 3.5 hours at a frequency of about two cycles per minute. During the heating phase, a gas containing a mixture of 0.7 volume percent $SO_2$, 1.4 volume percent NO and the balance air is bubbled through the test samples and during the cooling phase, water vapor was bubbled through the test samples. At the end of the test period, which testing cycle can be repeated as necessary to determine the inhibiting effect of any additive, the wall surfaces of the test flasks in which the samples are contained are visually evaluated as to the varnish inhibition. The amount of varnish deposited on the walls is rated at values of from one to eleven with the higher number being the greater amount of varnish. It has been found that this test forecasts the varnish results obtained as a consequence of carrying out the ASTM MS-VD engine test which is described more fully hereinbelow.

Table 1, which follows, summarizes the characteristics of dispersant materials prepared in accordance with EXAMPLES 1–6.

TABLE 1

| DISPERSANT ADDUCT, EX. NO. | PROPERTIES OF DISPERSANT ADDUCTS | | | | | |
|---|---|---|---|---|---|---|
| | WT % N[1] | PIB, $\overline{M}_n$ | Wt % CL[2] | VISCOSITY CST AT 100° C. | SIB[3] | VIB[4] |
| 1 (control) | 2.13 | 1300 | 0 | 168 | 5.42 | 4 |
| 2 | 2.06 | 1300 | 1 | 191.4 | 5.42 | 3 |
| 3 | 1.67 | 1300 | 2 | 207.6 | 5.74 | 3 |
| 4 (control) | 1.47 | 900 | 0 | 124.2 | 3.60 | 7 |
| 5 | 1.51 | 900 | .5 | 133.0 | 3.43 | 5 |
| 6 | 1.51 | 900 | 1 | 142.0 | 3.06 | 8 |
| 7 | | | | | | |
| 8 | | | | | | |
| 9 | | | | | | |
| 10 | | | | | | |

[1] = number average molecular weight of the PIB molecules
[2] = weight percent of E-caprolactone (CL) moieties in dispersant adduct.
[3] = mg sludge per 10 mg of sludge (rated on basis of 1 to 10, 1 being the best rating).
[4] = varnish rating visual (rated 1 to 11, 1 being the best rating).

The data in Table 1 shows that increasing the caprolactone content improves the VIB values of the polycaprolactone modified Mannich base adducts having the higher molecular weight PIB. In all practical systems the values obtained using the polycaprolactone modified Mannich base adducts of this invention are within acceptable limits.

EXAMPLE 7

A Mannich base dispersant product was made by heating 222 g. of polyisobutenyl phenol (PIB $\overline{M}n=2250$, ai$=63.4$ wt. %, viscosity$=1992$ cst. at 100° C.) with 9.5 g of tetraethylene pentamine (TEPA), 3.6 g of formaldehyde ($CH_2O$) and 69 g of S150N mineral oil at 80° C. for 1 hour, followed by heating at 130° C. for 2 hours with nitrogen stripping. The resulting product was filtered and collected and was analyzed for 1.03 wt. % nitrogen.

EXAMPLE 8

To the Mannich base product prepared in EXAMPLE 7, there was added 3 g of CL, and 0.1 g of Sn Oct$_2$. The mixture was then heated at 160° C. for about 2 hours. The resulting solution was nitrogen stripped, filtered, analyzed, and subjected to the standard SIB and VIB tests.

EXAMPLE 9

A TEPA-polycaprolactone adduct was prepared by heating a mixture of 9.5 g of TEPA, 3 g of CL, 0.1 g of SnOct$_2$ and 69 g of S150N mineral oil at 160° C. for 1 hour. The resulting solution was cooled and mixed with 3.6 g of $CH_2O$ and 222 g of the PIBSA-phenol that was used in EXAMPLE 7. The reaction mixture was heated at 80° C. for 1 hour, and then at 130° C. for 2 hour, and was then nitrogen stripped, filtered, analyzed and subjected to the standard SIB and VIB tests.

EXAMPLE 10

222 g of the PIB-phenol that was used in EXAMPLE 7 was mixed with 3 g of CL, 0.1 g Sn Oct$_2$ and 69 g of S150N oil, whereafter the mixtures was heated 160° C. for 1 hour. Thereafter, the reaction mixture was cooled and 9.5 g of TEPA and 3.6 g of CH$_2$O were added thereto. The resulting mixture was then heated at 80° C. for 1 hour, and then at 130° C. for 2 hours with nitrogen stripping. The resulting polycaprolactone modified Mannich base dispersant solution was then filtered, analyzed and subjected to the standard SIB and VIB tests.

EXAMPLE 11

9.5 g of TEPA, 3 g of CL, 0.1 g of SnOct$_2$, 3.6 g of CH$_2$O and 69 g of S150N mineral oil were admixed and heated at 80° C. for 1 hour. The reaction mass was then cooled and 222 g of the PIB-phenol that was used in EXAMPLE 7 were added to the reaction mass. The resulting admixture was heated at 80° C. for 1 hour and then at 130° C. for 2 hours with nitrogen stripping. The resulting polycaprolactone modified Mannich base dispersant was filtered, analyzed, and subjected to the standard SIB and VIB tests.

Table 2, which follows, summarizes the characteristics of the dispersant materials prepared in accordance with EXAMPLES 7-11.

TABLE 2

| EXAMPLE NO | PIB-PHENOL(g) | TEPA g | CH$_2$O g | CL g | S150N g | SnOct$_2$[1] g | HAZE[2] | % N | VISCOSITY CST at 100° C. | SIB | VIB |
|---|---|---|---|---|---|---|---|---|---|---|---|
| 7 | 222 | 9.5 | 3.6 | 0 | 69 | 0.1 | 3 | 1.03 | 1083 | 2.10 | 3-4 |
| 8 | 222 | 9.5 | 3.6 | 3 | 69 | 0.1 | 25 | .89 | 1248 | 2.10 | 3-4 |
| 9 | 222 | 9.5 | 3.6 | 3 | 69 | 0.1 | 130 | .91 | 1302 | 2.44 | 3 |
| 10 | 222 | 9.5 | 3.6 | 3 | 69 | 0.1 | 18 | .90 | 1018 | 2.59 | 4 |
| 11 | 222 | 9.5 | 3.6 | 3 | 69 | 0.1 | 51 | .75 | 833 | 5.71 | 3 |

[1] = stannous octoanate catalyst
[2] = nephelometer reading
[3] = centistokes

EXAMPLE 12

About 200 g of the product of EXAMPLE 8 were mixed with about 4.0 g of boric acid. The mixture was and heated to 163° C. while stirring and nitrogen sparging. The mixture was kept at 163° C. to 2 hours, sparged with nitrogen for one half hour, and filtered. The resulting product analyzed for 0.35 wt. % boron.

EXAMPLE 13

About 200 g of the material prepared in accordance with EXAMPLE 3 were heated to 163° C. while stirring under a nitrogen blanket. Boric acid (40 g) was added slowly for a period of two hours. The reaction mixture was heated at 163° C. for another 2 hours while sparging with nitrogen. Filtered and collected product analyzed for 1.67 wt. % N and 0.34 wt. % Boron.

As will be evident to those skilled in the art, various modifications on this invention can be made or followed, in light of the foregoing disclosure and illustrative examples, tables and discussion, without departing from the spirit and scope of the disclosure or from the scope of the invention as set forth in the following claims.

What is claimed is:

1. A post-treated poly(C$_5$-C$_9$ lactone) modified Mannich base useful as an oil additive and formed by reacting a C$_5$-C$_9$ lactone, an amine, an aldehyde, and a hydrocarbyl hydroxy aromatic compound, said hydrocarbyl substituted hydroxy aromatic compound being formed by reacting an olefin polymer of a C$_2$-C$_{10}$ monoolefin having a number average molecular weight of about 700 to about 10,000 and a hydroxy aromatic material, and said poly (C$_5$-C$_9$ lactone) modified Mannich base adduct containing the unit

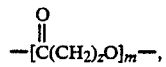

wherein m has an average value of from 0.2 to about 100, and z is 4 to 8, and post-treating said adduct with a boron compound.

2. The post-treated poly (C$_5$-C$_9$ lactone) modified Mannich base adduct according to claim 1, wherein said adduct has been prepared by first reacting said hydrocarbyl substituted hydroxy aromatic compound with said amine and said aldehyde to form an intermediate Mannich base adduct having an amino functional group capable of initiating lactone open ring polymerization, and then reacting said lactone with said intermediate Mannich base adduct.

3. The post-treated poly (C$_5$-C$_9$ lactone) modified Mannich base adduct according to claim 1, wherein said adduct has been prepared by first reacting said amine with said lactone to form a poly(C$_5$-C$_9$ lactone) intermediate adduct, and thereafter mixing said intermediate poly(C$_5$-C$_9$ lactone) adduct with said aldehyde and said hydrocarbyl substituted hydroxy aromatic compound, and subjecting the admixture to a Mannich base reaction.

4. The post-treated poly (C$_5$-C$_9$ lactone) modified Mannich base adduct according to claim 1, wherein said adduct has been prepared by first reacting said lactone with said hydrocarbyl substituted hydroxy aromatic compound to form a poly(C$_5$-C$_9$ lactone) intermediate adduct, and thereafter reacting with said poly(C$_5$-C$_9$ lactone) intermediate adduct a mixture of said aldehyde and said amine.

5. The post-treated poly (C$_5$-C$_9$ lactone) modified Mannich base adduct according to claim 1, wherein said adduct has been prepared by first reacting said amine with said aldehyde and said C$_5$-C$_9$ lactone to form a Mannich base intermediate, and then admixing and reacting said hydrocarbyl substituted hydroxy aromatic compound with said Mannich base intermediate.

6. The post-treated poly (C$_5$-C$_9$ lactone) modified Mannich base adduct material according to claim 2, wherein said C$_5$-C$_9$ lactone is E-caprolactone.

7. The post-treated poly (C$_5$-C$_9$ lactone) modified Mannich base adduct material according to claim 3, wherein said C$_5$-C$_9$ lactone is E-caprolactone.

8. The post-treated poly (C₅–C₉ lactone) modified Mannich base adduct material according to claim 4, wherein said C₅–C₉ lactone is E-caprolactone.

9. The post-treated poly (C₅–C₉ lactone) modified Mannich base adduct material according to claim 5, wherein said C₅–C₉ lactone is E-caprolactone.

10. The post-treated poly (C₅–C₉ lactone) modified Mannich base adduct material according to claim 1, wherein said C₅–C₉ lactone is E-caprolactone.

11. The post-treated adduct material according to claim 2, wherein said hydrocarbyl substituted hydroxy aromatic material is a member selected from the group of materials having the formula

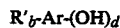

wherein Ar represents

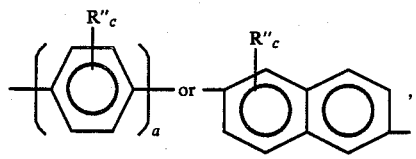

wherein a is 1 or 2, R' is a long chain hydrocarbon R" is a hydrocarbon or substituted hydrocarbon radical having from 1 to about 3 carbon atoms or a halogen radical, b is an integer from 1 to 2, c is an integer from 0 to 2, and d is an integer from 1 to 2.

12. The post-treated adduct material according to claim 3, wherein said hydrocarbyl substituted hydroxy aromatic material is a member selected from the group of materials having the formula

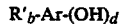

wherein Ar represents

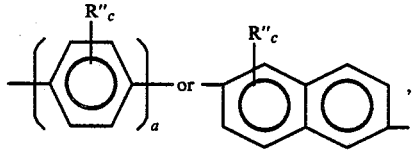

wherein a is 1 to 2, R' is a long chain hydrocarbon R" is a hydrocarbon or substituted hydrocarbon radical having from 1 to about 3 carbon atoms or a halogen radical, b is an integer from 1 to 2, c is an integer from 0 to 2, and d is an integer from 1 to 2.

13. The post-treated adduct material according to claim 4, wherein said hydrocarbyl substituted hydroxy aromatic material is a member selected from the group of materials having the formula

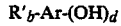

wherein Ar represents

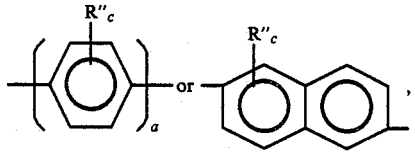

wherein a is 1 or 2, R' is a long chain hydrocarbon R" is a hydrocarbon or substituted hydrocarbon radical having from 1 to about 3 carbon atoms or a halogen radical, b is an integer from 1 to 2, c is an integer from 0 to 2, and d is an integer from 1 to 2.

14. The post-treated adduct material according to claim 5, wherein said hydrocarbyl substituted hydroxy aromatic material is a member selected from the group of materials having the formula

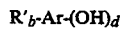

wherein Ar represents

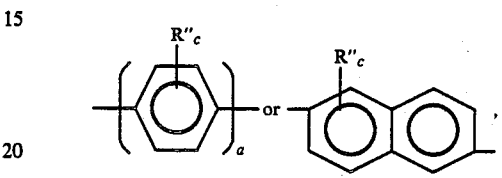

wherein a is 1 or 2, R' is a long chain hydrocarbon R" is a hydrocarbon or substituted hydrocarbon radical having from 1 to about 3 carbon atoms or a halogen radical, b is an integer from 1 to 2, c is an integer from 0 to 2, and d is an integer from 1 to 2.

15. The post-treated adduct material according to claim 11, wherein said hydrocarbyl-substituted hydroxy aromatic compound is a polyolefin phenol.

16. The post-treated adduct material according to claim 12, wherein said hydrocarbyl-substituted hydroxy aromatic compound is a polyolefin phenol.

17. The post-treated adduct material according to claim 13, wherein said hydrocarbyl-substituted hydroxy aromatic compound is a polyolefin phenol.

18. The post-treated adduct material according to claim 14, wherein said hydrocarbyl-substituted hydroxy aromatic compound is a polyolefin phenol.

19. The post-treated adduct material according to claim 15, wherein said olefin polymer is polyisobutylene.

20. The post-treated adduct material according to claim 16, wherein said olefin polymer is polyisobutylene.

21. The post-treated adduct material according to claim 17, wherein said olefin polymer is polyisobutylene.

22. The post-treated adduct material according to claim 18, wherein said olefin polymer is polyisobutylene.

23. The post-treated adduct material according to claim 2, wherein said amine is selected from the group consisting of polyamines of about 2 to 60 total carbon atoms and about 2 to 12 nitrogen atoms in the molecule.

24. The post-treated adduct material according to claim 3, wherein said amine is selected from the group consisting of polyamines of about 2 to 60 total carbon atoms and about 2 to 12 nitrogen atoms in the molecule.

25. The post-treated adduct material according to claim 4, wherein said amine is selected from the group consisting of polyamines of about 2 to 60 total carbon atoms and about 2 to 12 nitrogen atoms in the molecule.

26. The post-treated adduct material according to claim 5, wherein said amine is selected from the group consisting of polyamines of about 2 to 60 total carbon atoms and about 2 to 12 nitrogen atoms in the molecule.

27. The post-treated adduct material according to claim 23, wherein said amine is an aliphatic saturated amine having the formula

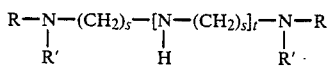

wherein R and R' independently are selected from the group consisting of hydrogen, $C_1$ to $C_{25}$ straight or branched chain alkyl radicals, $C_1$ to $C_{12}$ alkoxy $C_2$ to $C_6$ alkylene radicals, and $C_1$ to $C_{12}$ alkylamino $C_2$ to $C_6$ alkylene radicals; each s is the same or a different number of from 2 to 6; and t is a number of from 0 to 10, with the provision that when $t=0$, at least one of R or R' must be H such that there are at least two of either primary or secondary amino groups.

28. The post-treated adduct material according to claim 24, wherein said amine is an aliphatic saturated amine having the formula

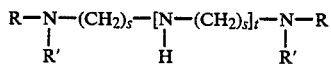

wherein R and R' independently are selected from the group consisting of hydrogen, $C_1$ to $C_{25}$ straight or branched chain alkyl radicals, $C_1$ to $C_{12}$ alkoxy $C_2$ to $C_6$ alkylene radicals, and $C_1$ to $C_{12}$ alkylamino $C_2$ to $C_6$ alkylene radicals; each s is the same or a different number of from 2 to 6; and t is a number of from 0 to 10, with the provision that when $t=0$, at least one of R or R' must be H such that there are at least two of either primary or secondary amino groups.

29. The post-treated adduct material according to claim 25, wherein said amine is an aliphatic saturated amine having the formula

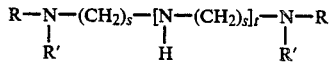

wherein R and R' independently are selected from the group consisting of hydrogen, $C_1$ to $C_{25}$ straight or branched chain alkyl radicals, $C_1$ to $C_{12}$ alkoxy $C_2$ to $C_6$ alkylene radicals, and $C_1$ to $C_{12}$ alkylamino $C_2$ to $C_6$ alkylene radicals; each s is the same or a different number of from 2 to 6; and t is a number of from 0 to 10, with the provision that when $t=0$, at least one of R or R' must be H such that there are at least two of either primary or secondary amino groups.

30. The post-treated adduct material according to claim 26, wherein said amine is an aliphatic saturated amine having the formula

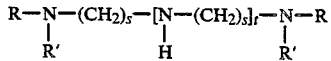

wherein R and R' independently are selected from the group consisting of hydrogen, $C_1$ to $C_{25}$ straight or branched chain alkyl radicals, $C_1$ to $C_{12}$ alkoxy $C_2$ to $C_6$ alkylene radicals, and $C_1$ to $C_{12}$ alkylamino $C_2$ to $C_6$ alkylene radicals; each s is the same or a different number of from 2 to 6; and t is a number of from 0 to 10, with the provision that when $t=0$, at least one of R or R' must be H such that there are at least two of either primary or secondary amino groups.

31. The post-treated adduct material of claim 27, wherein said amine is selected from the group consisting of 1, 2-diaminoethane; 1, 3-diaminopropane; 1, 4-diaminobutane; 1, 6-diaminohexane; diethylene triamine; triethylene tetramine; tetraethylene pentamine; 1, 2-propylene diamine; di-(1, 2-propylene)triamine; di-(1, 3-propylene) triamine; N, N-dimethyl-1, 3-diaminopropane; N, N-di-(2-aminoethyl) ethylene diamine; and N-dodecyl-1, 3-propane diamine.

32. The post-treated adduct material of claim 28, wherein said amine is selected from the group consisting of 1, 2-diaminoethane; 1, 3-diaminopropane; 1, 4-diaminobutane; 1, 6-diaminohexane; diethylene triamine; triethylene tetramine; tetraethylene pentamine; 1, 2-propylene diamine; di-(1, 2-propylene)triamine; di-(1, 3-propylene) triamine; N, N-dimethyl-1, 3-diaminopropane; N, N-di-(2-aminoethyl) ethylene diamine; and N-dodecyl-1, 3-propane diamine.

33. The post-treated adduct material of claim 29, wherein said amine is selected from the group consisting of 1, 2-diaminoethane; 1, 3-diaminopropane; 1, 4-diaminobutane; 1, 6-diaminohexane; diethylene triamine; triethylene tetramine; tetraethylene pentamine; 1, 2-propylene diamine; di-(1, 2-propylene)triamine; di-(1, 3-propylene) triamine; N, N-diemthyl-1, 3-diaminopropane; N, N-di-(2-aminoethyl) ethylene diamine; and N-dodecyl-1, 3-propane diamine.

34. The post-treated adduct material of claim 30, wherein said amine is selected from the group consisting of 1, 2-diaminoethane; 1, 3-diaminopropane; 1, 4-diaminobutane; 1, 6-diaminohexane; diethylene triamine; triethylene tetramine; tetraethylene pentamine; 1, 2-propylene diamine; di-(1, 2-propylene)triamine; di-(1, 3-propylene) triamine; N, N-dimethyl-1, 3-diaminopropane; N, N-di-(2-aminoethyl) ethylene diamine; and N-dodecyl-1, 3-propane diamine.

35. The post-treated adduct material according to claim 23, wherein said amine is selected from the group consisting of alicyclic diamines, imidazolines, morpholines, and N-aminoalkyl piperazines of the general formula:

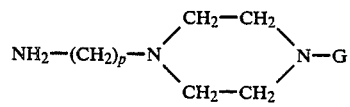

wherein G is independently selected from the group consisting of hydrogen and omega-(non-tertiary)aminoalkylene radicals of from 1 to 3 carbon atoms, and p is a number of from 1 to 4.

36. The post-treated adduct material according to claim 24, wherein said amine is selected from the group consisting of alicyclic diamines, imidazolines, morpholines, and N-aminoalkyl piperazines of the general formula:

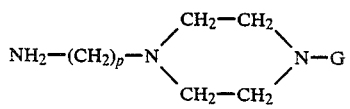

wherein G is independently selected from the group consisting of hydrogen and omega-(non-tertiary)aminoalkylene radicals of from 1 to 3 carbon atoms, and p is a number of from 1 to 4.

37. The post-treated adduct material according to claim 25, wherein said amine is selected from the group consisting of alicyclic diamines, imidazolines, morpholines, and N-aminoalkyl piperazines of the general formula:

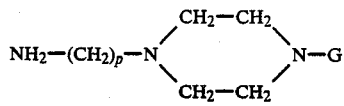

wherein G is independently selected from the group consisting of hydrogen and omega-(non-tertiary)aminoalkylene radicals of from 1 to 3 carbon atoms, and p is a number of from 1 to 4.

38. The post-treated adduct material according to claim 26, wherein said amine is selected from the group consisting of alicyclic diamines, imidazolines, morpholines, and N-aminoalkyl piperazines of the general formula:

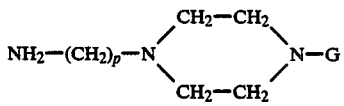

wherein G is independently selected from the group consisting of hydrogen and omega-(non-tertiary)aminoalkylene radicals of from 1 to 3 carbon atoms, and p is a number of from 1 to 4.

39. The post-treated adduct material according to claim 23, wherein said amine is a mixture of poly (ethyleneamines) averaging about 5 to about 7 nitrogen atoms per molecule.

40. The post-treated adduct material according to claim 24, wherein said amine is a mixture of poly (ethyleneamines) averaging about 5 to about 7 nitrogen atoms per molecule.

41. The post-treated adduct material according to claim 25, wherein said amine is a mixture of poly (ethyleneamines) averaging about 5 to about 7 nitrogen atoms per molecule.

42. The post-treated adduct material according to claim 26, wherein said amine is a mixture of poly (ethyleneamines) averaging about 5 to about 7 nitrogen atoms per molecule.

43. The post-treated adduct material of claim 19, wherein said $C_5-C_9$ lactone is E-caprolactone.

44. The post-treated adduct material of claim 20, wherein said $C_5-C_9$ lactone is E-caprolactone.

45. The post-treated adduct material of claim 21, wherein said $C_5-C_9$ lactone is E-caprolactone.

46. The post-treated adduct material of claim 22, wherein said $C_5-C_9$ lactone is E-caprolactone.

47. The post-treated adduct material of claim 1, wherein said post-treatment is conducted with a boron compound selected from the group consisting of borates of iron, cobalt, nickel, copper, chromium, manganese, molybdenum, tungsten, ruthenium, palladium, platinum, cadmimum, lead, silver, mercury and antimony.

48. The post-treated adduct material of claim 1, wherein the post-treatment is conducted with a boron compound selected from the group consisting of a boron oxide, boron oxide hydrate, boron halide, boron ester and boron ester.

49. The post-treated adduct material according to claim 1, wherein the average value of m is 1 to about 20.

50. The post-treated adduct material according to claim 6, wherein the average value of m is 1 to about 20.

51. The post-treated adduct material according to claim 43, wherein the average value of m is 1 to about 20.

52. An oleaginous composition comprising a fuel lubricating, and a poly ($C_5-C_9$ lactone) modified Mannich base adduct material prepared by reacting an amine, a hydrocarbyl substituted hydroxy aromatic compound, an aldehyde, and a $C_5-C_9$ lactone, wherein said hydrocarbyl substituted hydroxy aromatic compound has been formed by reacting an olefin polymer of a $C_2-C_{10}$ monoolefin of 700 to about 10,000 $\overline{M}_n$ with a hydroxy aromatic compound, and wherein said poly ($C_5-C_9$ lactone) modified Mannich base adduct material contains the unit

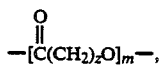

where m is a number having an average value of from 0.2 to about 100, and z is 4 to 8.

53. An oleaginous composition according to claim 52, wherein said poly($C_5-C_9$ lactone) modified Mannich base adduct material has been prepared by first reacting said hydrocarbyl substituted hydroxy aromatic compound with said amine and said aldehyde to form an intermediate Mannich base adduct having an amino functional group capable of initiating lactone open ring polymerization, and then reacting said lactone with said intermediate adduct.

54. An oleaginous composition according to claim 52, wherein said poly($C_5-C_9$ lactone) modified Mannich base adduct material has been prepared by first reacting said amine with said lactone to form poly($C_5-C_9$ lactone) intermediate adduct, and thereafter mixing said intermediate adduct with said aldehyde and said hydrocarbyl substituted hydroxy aromatic compound, subjecting the admixture to a Mannich base reaction.

55. An oleaginous composition according to claim 52, wherein said poly($C_5-C_9$ lactone) modified Mannich base adduct material has been prepared by first reacting said lactone with said hydrocarbyl substituted hydroxy aromatic compound to form a poly ($C_5-C_9$ lactone) intermediate adduct, and thereafter reacting with said poly($C_5-C_9$ lactone) adduct a mixture of said aldehyde and said amine.

56. An oleaginous composition according to claim 52, wherein said poly($C_5-C_9$ lactone) modified Mannich base adduct material has been prepared by first reacting said amine with said aldehyde and said $C_5-C_9$ lactone to form a Mannich base intermediate, and then admixing and reacting said hydrocarbyl substituted hydroxy aromatic compound with said Mannich base intermediate.

57. The oleaginous composition according to claim 52, wherein said $C_5-C_9$ lactone monomer is E-caprolactone.

58. The oleaginous composition according to claim 52, wherein said poly($C_5-C_9$ lactone) modified Mannich base adduct material has been post-treated with a complex-forming metal or boron compound.

59. The oleaginous composition according to claim 58, wherein the post-treatment is conducted with a boron oxide, boron oxide hydrate, boron halide, boron ester and boron acid.

60. A lubricating oil composition comprising lubricating oil and about 0.01 to 15 wt. % of the post-treated poly ($C_5$-$C_9$) lactone modified Mannich base adduct material of claim 1.

61. A lubricating oil comprising a major amount of lubricating oil and about 0.1 to 10 wt. % of the post-treated poly ($C_5$-$C_9$) lactone modified Mannich base adduct material of claim 1.

62. A lubricating oil comprising a major amount of lubricating oil and about 0.1 to 10 wt. % of the post-treated poly ($C_5$-$C_9$) lactone modified Mannich base adduct material according to claim 2.

63. A lubricating oil comprising a major amount of lubricating oil and about 0.1 to 10 wt. % of the post-treated poly ($C_5$-$C_9$) lactone modified Mannich base adduct material according to claim 3.

64. A lubricating oil comprising a major amount of lubricating oil and about 0.1 to 10 wt. % of the post-treated poly ($C_5$-$C_9$) lactone modified Mannich base adduct material according to claim 4.

65. A lubricating oil comprising a major amount of lubricating oil and about 0.1 to 10 wt. % of the post-treated poly ($C_5$-$C_9$) lactone modified Mannich base adduct material according to claim 5.

66. A lubricating oil comprising a major amount of lubricating oil and about 0.1 to 10 wt. % of the post-treated poly ($C_5$-$C_9$) lactone modified Mannich base adduct material according to claim 51.

67. An oil composition containing 0.01 to 15 wt. %, based on the weight of the total composition, of a borated poly ($C_5$-$C_9$ lactone) modified Mannich base adduct material according to claim 48.

68. A lubricating oil composition containing 0.01 to 15 wt. %, based on the weight of the total composition, of a poly ($C_5$-$C_9$ lactone) modified Mannich base adduct material according to claim 2.

69. A lubricating oil composition containing 0.01 to 15 wt. %, based on the weight of the total composition, of a post-treated poly ($C_5$-$C_9$ lactone) modified Mannich base adduct material according to claim 3.

70. A lubricating oil composition containing 0.01 to 15 wt. %, based on the weight of the total composition, of a post-treated poly ($C_5$-$C_9$ lactone) modified Mannich base adduct material according to claim 4.

71. A lubricating oil composition containing 0.01 to 15 wt. %, based on the weight of the total composition, of a post-treated poly ($C_5$-$C_9$ lactone) modified Mannich base adduct material according to claim 5.

72. A post-treated oil soluble dispersant useful as an oil additive, comprising the product of a reaction of:
(I) a hydrocarbyl substituted hydroxy aromatic compound of the formula $$R'^b\text{-Ar-}(OH)^d$$

wherein Ar represents

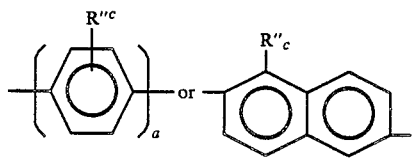

wherein a is 1 or 2, R' is a long chain hydrocarbon, R" is a hydrocarbon or substituted hydrocarbon radical having from 1 to about 3 carbon atoms or a halogen radical, b is an integer from 1 to 2, c is an integer from 0 to 2, and d is an integer from 1 to 2;
(II) a $C_5$-$C_9$ lactone, wherein there are, on the average, 0.2 to about 100 $C_5$-$C_9$ lactone derived moieties per moiety of said hydrocarbyl substituted hydroxy aromatic compound used in the reaction;
(III) an aldehyde having the formula R"CHO, where R" is hydrogen or an aliphatic hydrocarbon radical having from 1 to 4 carbon atoms; and
(IV) an amine, said product having been post-treated with a boron compound.

73. An post-treated oil soluble dispersant according to claim 72 wherein said dispersant has been prepared by first reacting said amine with said hydrocarbyl substituted aromatic compound and said aldehyde to form an intermediate Mannich base adduct having an amino functional group capable of initiating lactone open ring polymerization, and then reacting said lactone with said intermediate Mannich base adduct.

74. An post-treated oil soluble dispersant according to claim 72, wherein said dispersant has been prepared by first reacting said amine with said $C_5$-$C_9$ lactone to form poly($C_5$-$C_9$ lactone) intermediate adduct, and thereafter mixing said intermediate poly($C_5$-$C_9$ lactone) adduct with said aldehyde and said hydrocarbyl-substituted hydroxy aromatic compound, and subjecting the admixture to a Mannich base reaction.

75. An post-treated oil soluble dispersant according to claim 72, wherein said dispersant has been prepared by first reacting said lactone with said hydrocarbyl-substituted hydroxy aromatic compound to form a poly ($C_5$-$C_9$ lactone) intermediate adduct, and thereafter reacting with said poly ($C_5$-$C_9$ lactone) adduct a mixture of said aldehyde and said amine.

76. An post-treated oil soluble dispersant according to claim 72, wherein said dispersant has been prepared by first reacting said amine with said aldehyde and said $C_5$-$C_9$ lactone to form a Mannich base intermediate, and then admixing and reacting said hydrocarbyl substituted hydroxy aromatic compound with said Mannich base intermediate.

77. An post-treated oil soluble dispersant according to claim 72, wherein said $C_5$-$C_9$ lactone is E-caprolactone, and wherein said dispersant contains the unit $$-[\overset{\overset{\displaystyle O}{\|}}{C}(CH_2)_5O]_m-,$$

wherein m is from 1 to about 20.

78. An post-treated oil soluble dispersant according to claim 77, wherein said polyamine is selected from the group consisting of polyamines of about 2 to 60 total carbon atoms and about 2 to 12 nitrogen atoms in the molecule.

79. An post-treated oil soluble dispersant according to claim 78, wherein said polyamine is an aliphatic saturated amine having the general formula

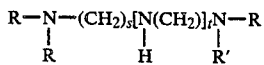

wherein R and R' independently are selected from the group consisting of hydrogen, $C_1$ to $C_{25}$ straight or branched chain alkyl radicals, $C_1$ to $C_{12}$ alkoxy $C_2$ to $C_6$ alkylene radicals, and $C_1$ to $C_{12}$ alkylamino $C_2$ to $C_6$ alkylene radicals; each s is the same or a different number of from 2 to 6; and t is a number of from 0 to 10, with the proviso that when t=0, at least one of R or R' must be H such that there are at least two of either primary or secondary amino groups.

80. An post-treated oil soluble dispersant according to claim 79, wherein said polyamine is selected from the group consisting of 1,2-diaminoethane; 1,3-diaminopropane; 1,4-diaminobutane; 1,6-diaminohexane; diethylene triamine; triethylene tetramine; tetraethylene pentamine; 1,2-propylene diamine; di-(1,2-propylene)triamine; di-(1,3-propylene triamine; N,N-dimethyl-1,3-diaminopropane; N,N-di-(2-aminoethyl) ethylene diamine; and N-dodecyl-1,3-propane diamine.

81. The post-treated oil soluble dispersant of claim 78, wherein said amine is selected from the group consisting alicyclic diamines, imidazoles, morpholines, and N-aminoalkyl piperazines of the general formula:

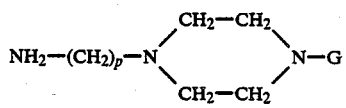

82. The post-treated oil soluble dispersant according to claim 78, wherein said polyamine is a mixture of poly(ethyleneamines) averaging about 5 to about 7 nitrogen atoms per molecule.

83. The post-treated oil soluble dispersant according to claim 78, wherein said polyamine is a polyoxyalkylene polyamine having the formula:

$$NH_2\text{-alkylene-(O-alkylene)}_m\text{-}NH_2$$

where m has a value of about 3 to 70; or $$R\text{-[alkylene-(O-alkylene)}_n\text{-}NH_2]_a$$

where n has a value of about 1 to 40 with the proviso that the sum of all the n's is from about 3 to about 70, R is a substituted saturated hydrocarbon radical of up to ten carbon atoms, wherein the number of substituents on the R group is represented by the value of "a", which is a number from 3 to 6.

84. The post-treated oil soluble dispersant according to claim 72, wherein said post-treatment is conducted with a boron compound selected from the group consisting of borates of iron, cobalt, nickel, copper, chromium, manganese, molybdenum, tungsten, ruthenium, palladium, platinum, cadmium, lead, silver, mercury and antimony.

85. The post-treated oil soluble dispersant according to claim 72, wherein the post-treatment is conducted with a boron compound selected from the group consisting of a boron oxide, boron oxide hydrate, boron halide, boron ester and boron acid.

86. A post-treated oil soluble reaction product useful as an oil additive comprising an oil soluble reaction product of:
(a) polymer consisting essentially of $C_2$ to $C_{10}$ monoolefin, said polymer having a number average molecular weight of 700 to 10,000 and being substituted with hydroxy aromatic moieties selected from the group consisting of hydroxy phenyl, substituted hydroxy phenyl, hydroxy naphthyl, and substituted hydroxy naphthyl,
(b) amine containing 2 to 60 carbon atoms and 2 to 12 nitrogen groups,
(c) aldehyde having the formula,

RCHO, where R is hydrogen or an aliphatic hydrocarbon radical having 1 to 4 carbon atoms, and
(d) $C_5$–$C_9$ lactone, wherein there are, on the average, about 0.2 to 100 molar proportions of (d) per molar proportion of said oil soluble reaction product, and wherein said oil soluble reaction product is post-treated with a boron compound.

87. The post-treated oil soluble reaction product of claim 86 wherein (a) is first reacted with (b) and (c) to form a Mannich base intermediate, and wherein (d) is then reacted with said Mannich base intermediate.

88. The post-treated oil soluble reaction product of claim 86 wherein (b) is first reacted with (d) to form a poly($C_5$–$C_9$ lactone) intermediate, and wherein a mixture of (a) and (c) is then reacted with said poly ($C_5$–$C_9$ lactone) intermediate.

89. The post-treated oil soluble reaction product of claim 86 wherein (a) is reacted with (d) to form a poly ($C_5$–$C_9$ lactone) intermediate, and wherein said poly ($C_5$–$C_9$ lactone) intermediate is then reacted with a mixture of (b) and (c).

90. The post-treated oil soluble reaction product of claim 86 wherein (b) is reacted with (c) and (d) to form a poly($C_5$–$C_9$ lactone) intermediate, and wherein (a) is then reacted with said poly ($C_5$–$C_9$ lactone) intermediate.

91. The post-treated oil soluble reaction product according to claim 86, wherein (b) is an aliphatic saturated amine having the general formula

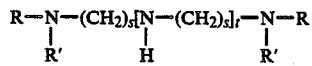

wherein R and R' independently are selected from the group consisting of hydrogen, $C_1$ to $C_{25}$ straight or branched chain alkyl radicals, $C_1$ to $C_{12}$ alkoxy $C_2$ to $C_6$ alkylene radicals, and $C_1$ to $C_{12}$ alkylamino $C_2$ to $C_6$ alkylene radicals; each s is the same or a different number of from 2 to 6, and t is a number of from 0 to 10, with the provison that when $t=0$, at least one of R or R' must be H such that there are at least two of either primary or secondary amino groups.

92. The post-treated oil soluble reaction product according to claim 91, wherein (b) is amine is selected from the group consisting of 1,2-diaminoethane; 1,3-diaminopropane; 1,4-diaminobutane; 1,6-diaminohexane; diethylene triamine; triethylene tetramine; tetraethylene pentamine; 1,2-propylene diamine; di-(1,2-propylene)triamine; di-(1,3propylene triamine; N,N-dimethyl-1,3-diaminopropane; N,N-di-(2-aminoethyl) ethylene diamine; and N-dodecyl-1,3-propane diamine.

93. The post-treated oil soluble reaction product according to claim 86, wherein (b) is a mixture of poly(ethyleneamines) averaging about 5 to about 7 nitrogen atoms per molecule.

94. The post-treated oil soluble reaction product according to claim 86, wherein (a) is polyisobutylene of about 700 to 3,000 molecular weight substituted with hydroxy phenyl or substituted hydroxy phenyl moieties.

95. The post-treated oil soluble reaction product according to claim 94, wherein (d) is E-caprolactone and wherein there are about 1 to 20 molar proportions of (d) per molar proportion of said reaction product.

96. The post-treated oil soluble reaction product according to claim 95, wherein (b) is an aliphatic saturated amine having the general formula

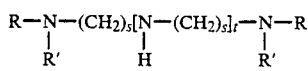

wherein R and R' independently are selected from the group consisting of hydrogen, $C_1$ to $C_{25}$ straight or branched chain alkyl radicals, $C_1$ to $C_{12}$ alkoxy $C_2$ to $C_6$ alkylene radicals, and $C_1$ to $C_{12}$ alkylamino $C_2$ to $C_6$ alkylene radicals; each s is the same or a different number of from 2 to 6, and t is a number of from 0 to 10, with the provison that when t=0, at least one of R or R' is H such that there are at least two of either primary or secondary amino groups.

97. The post-treated oil soluble reaction product according to claim 95, wherein (b) is a mixture of poly(ethyleneamines) averaging about 5 to about 7 nitrogen atoms per molecule.

98. The post-treated oil soluble reaction product according to claim 86 wherein said post-treatment is conducted with a boron compound selected from the group consisting of borates of iron, cobalt, nickel, copper, chromium, manganese, molybdenum, tungsten, ruthenium, palladium, platinum, cadmium, lead, silver, mercury and antimony.

99. An oleaginous composition comprising lubricating oil containing the oil soluble reaction product of claim 86.

100. The oleaginous composition according to claim 99, wherein said oleaginous material is lubricating oil.

101. The oleaginous composition of claim 99, wherein said lactone is E-caprolactone and wherein there are, on the average, from about 1 to 20 molar proportions of lactone per molar proportion of said oil soluble reaction product.

102. The oleaginous composition according to claim 99, wherein said amine is an aliphatic saturated amine having the general formula

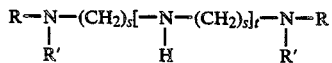

wherein R and R' independently are selected from the group consisting of hydrogen, $C_1$ to $C_{25}$ straight or branched chain alkyl radicals, $C_1$ to $C_{12}$ alkoxy $C_2$ to $C_6$ alkylene radicals, and $C_1$ to $C_{12}$ alkylamino $C_2$ to $C_6$ alkylene radicals; each s is the same or a different number of from 2 to 6, and t is a number of from 0 to 10, with the provison that when t=0, at least one of R and R' is H such that there are at least two primary or secondary amino groups present in said polyamine.

103. The oleaginous composition according to claim 99, wherein said amine is a mixture of poly(ethyleneamines) averaging about 5 to about 7 nitrogen atoms per molecule.

104. The oleaginous composition according to claim 101, wherein (a) is polyisobutylene of about 700 to 3,000 molecular weight substituted with hydroxy phenyl or substituted hydroxy phenyl moieties.

105. The oleaginous composition according to claim 99, wherein (a) is polyisobutylene of about 700 to 3,000 molecular weight substituted with hydroxy phenyl or substituted hydroxy phenyl moieties.

106. The oleaginous composition according to claim 99, wherein said post-treatment is conducted with a boron compound selected from the group consisting of borates of iron, cobalt, nickel, copper, chromium, manganese, molybdenum, tungsten, ruthenium, palladium, platinum, cadmium, lead, silver, mercury and antimony.

107. A lubricating crankcase motor oil composition for automotive vehicles and trucks comprising a major amount of lubricating oil; from about 0.01 to 15 wt. % of the post-treated oil soluble reaction product of claim 86; and an effective amount of a viscosity modifier.

108. The composition according the claim 107, wherein said composition also contains an effective amount of an anti-wear agent.

109. A lubricating crankcase motor oil composition for automotive vehicles and trucks comprising a major amount of lubricating oil; from about 0.01 to 15 wt. % of the post-treated oil soluble reaction product of claim 87; and an effective amount of a viscosity modifier.

110. The composition according the claim 109, wherein said composition also contains an effective amount of an anti-wear agent.

111. An additive concentrate comprising about 20 to 80 wt. % lubricating oil and 20 to about 80 wt. % of an post-treated oil soluble reaction product which is a post-treated poly ($C_5$-$C_9$ lactone) modified Mannich base according to claim 86.

112. The additive concentrate according to claim 111, wherein said post-treated oil soluble reaction product has been prepared by first reacting polymer (a) with amine (b) and aldehyde (c) to form a Mannich base intermediate, and then reacting said $C_5$-$C_9$ lactone (d) with said Mannich base intermediate, and then post-treating with a boron compound.

113. The concentrate according to claim 111, which also contains an effective amount of a viscosity modifier.

114. The concentrate according to claim 113, which also contains an effective amount of an antiwear agent.

115. The concentrate according to claim 112 wherein said boron compound comprises a member selected from the group consisting of a boron oxide, boron oxide hydrate, boron halide, boron ester and boron acid.

116. The concentrate according to claim 112, wherein said lactone is E-caprolactone, and wherein said post-treated oil soluble reaction product contains, on the average, from 1 to 20 caprolactone moieties per molecule of said monoolefin polymer.

117. An additive concentrate according to claim 116, which also contains an effective amount of a viscosity modifier.

118. An additive concentrate according to claim 117, which also contains an effective amount of a zinc dihydrocarbyl dithiophosphate.

119. An additive concentrate according to claim 118, wherein said post-treated oil soluble reaction product has been post-treated with a boron compound selected from the group consisting of a boron oxide, boron oxide hydrate, boron halide, boron ester and boron acid.

* * * * *